US011806897B2

(12) United States Patent
Urdaneta et al.

(10) Patent No.: US 11,806,897 B2
(45) Date of Patent: Nov. 7, 2023

(54) ADJUSTING CONTROL GAIN BASED ON ERROR SAMPLING IN AUTOMATED CEMENT MIXING

(71) Applicant: Schlumberger Technology Corporation, Sugar Land, TX (US)

(72) Inventors: Carlos Junior Urdaneta, Houston, TX (US); James Dean, Houston, TX (US); Oscar Montemayor, Missouri City, TX (US); Rajnarayanan Subbu Balsamy, Sugar Land, TX (US); Dinh Quy Nguyen, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 787 days.

(21) Appl. No.: 16/468,648

(22) PCT Filed: Dec. 12, 2017

(86) PCT No.: PCT/US2017/065663
§ 371 (c)(1),
(2) Date: Jun. 11, 2019

(87) PCT Pub. No.: WO2018/111785
PCT Pub. Date: Jun. 21, 2018

(65) Prior Publication Data
US 2020/0206975 A1 Jul. 2, 2020

Related U.S. Application Data

(60) Provisional application No. 62/433,040, filed on Dec. 12, 2016.

(51) Int. Cl.
*G05B 6/02* (2006.01)
*B28C 7/04* (2006.01)
(Continued)

(52) U.S. Cl.
CPC ............ *B28C 7/0418* (2013.01); *B28C 9/004* (2013.01); *E21B 33/13* (2013.01); *G05B 6/02* (2013.01)

(58) Field of Classification Search
CPC ....... B28C 7/0418; B28C 9/004; E21B 33/13; G05B 6/02; G05B 11/36
(Continued)

(56) References Cited

U.S. PATENT DOCUMENTS 4,571,993 A 2/1986 St. Onge
5,027,267 A 6/1991 Pitts et al.
(Continued)

FOREIGN PATENT DOCUMENTS

CN 103149887 A 6/2013
EP 0419281 A2 3/1991
WO 2016187242 A1 11/2016

OTHER PUBLICATIONS

Comparative study of a learning fuzzy PID controller and a self-tuning controller, By: Hassan, (Year: 2001).*
(Continued)

*Primary Examiner* — Jigneshkumar C Patel
(74) *Attorney, Agent, or Firm* — Jeffrey D. Frantz

(57) ABSTRACT

Methods and apparatus for controlling a characteristic of a cement slurry at a cementing unit, including regulating a characteristic of the cement slurry employing a closed loop feedback arrangement in the cementing unit, and adjusting a gain of the closed loop feedback arrangement in response to sampling an error of the characteristic.

20 Claims, 17 Drawing Sheets

(51) Int. Cl.
*B28C 9/00* (2006.01)
*E21B 33/13* (2006.01)
(58) Field of Classification Search
USPC .......................................................... 700/265
See application file for complete search history.

(56) References Cited

U.S. PATENT DOCUMENTS

| | | | |
|---|---|---|---|
| 5,114,239 A * | 5/1992 | Allen | ...................... B01F 25/10 366/65 |
| 5,452,954 A | 9/1995 | Handke et al. | |
| 5,570,743 A | 11/1996 | Padgett et al. | |
| 6,007,227 A | 12/1999 | Carlson | |
| 7,464,757 B2 | 12/2008 | Pessin et al. | |
| 7,494,263 B2 | 2/2009 | Dykstra et al. | |
| 2007/0153623 A1 | 7/2007 | Dykstra et al. | |
| 2008/0114554 A1 | 5/2008 | Mazrooee et al. | |
| 2008/0202415 A1 | 8/2008 | Miller et al. | |
| 2009/0118866 A1 * | 5/2009 | Dykstra | ................ B01F 35/213 700/265 |
| 2017/0268323 A1 * | 9/2017 | Dykstra | .................. E21B 47/00 |
| 2018/0094519 A1 * | 4/2018 | Stephens | ............. E21B 33/0355 |

OTHER PUBLICATIONS

Extended Search Report issued in European Patent Application No. 17880160.1 dated Jul. 7, 2020; 4 pages.

Preliminary Office Action issued in Brazil Patent Application No. BR112019012009-2 dated May 31, 2022, 6 pages with English translation.

Written Opinion issued in Brazil Patent Application No. BR112019012009-2 dated Jan. 31, 2023, 6 pages with partial English translation.

* cited by examiner

ADJUSTING CONTROL GAIN BASED ON ERROR SAMPLING IN AUTOMATED CEMENT MIXING

BACKGROUND OF THE DISCLOSURE

Well cementing may be utilized for cementing casing strings and liners, placing cement plugs, and performing remedial cement procedures. For example, dry powdered cement may be combined with water and perhaps chemical additives (dry or liquid), and the resulting mixture is sheared in a mixing operation until a homogeneous cement slurry is obtained. Specialized equipment is used to mix the cement slurry to a predetermined slurry density measured in mass per volume units (e.g., pound mass per gallon (lbm/gal) or kilograms per cubic meter ($kg/m^3$)). In some cases, batch mixers are used to mix and store cement slurry for jobs that exceed the volume capabilities of a cement mixer. In either scenario, high-pressure pumping equipment is used to place the cement slurry into the well.

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces an apparatus operable to control a characteristic of a cement slurry at a cementing unit. The apparatus includes a processor and a memory including computer program code. The processor, the memory, and the computer program code are collectively operable to regulate a characteristic of the cement slurry employing a closed loop feedback arrangement in the cementing unit, and to adjust a gain of the closed loop feedback arrangement in response to sampling an error of the characteristic.

The present disclosure also introduces a method for controlling a characteristic of a cement slurry at a cementing unit. The method includes regulating a characteristic of the cement slurry employing a closed loop feedback arrangement in the cementing unit, and adjusting a gain of the closed loop feedback arrangement in response to sampling an error of the characteristic.

These and additional aspects of the present disclosure are set forth in the description that follows, and/or may be learned by a person having ordinary skill in the art by reading the materials herein and/or practicing the principles described herein. At least some aspects of the present disclosure may be achieved via means recited in the attached claims.

BRIEF DESCRIPTION OF THE DRAWINGS

The present disclosure is understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
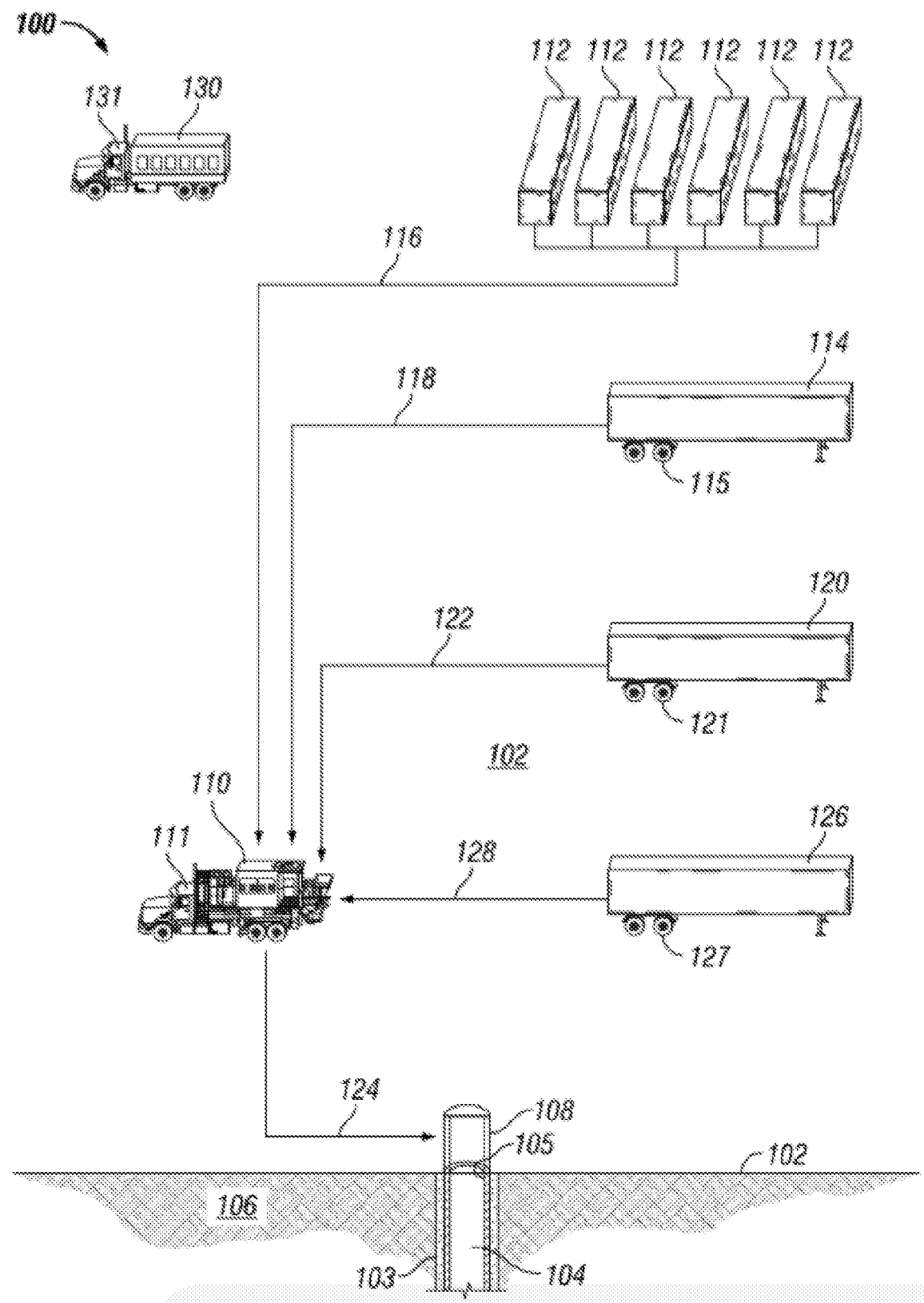
FIG. 1 is a schematic view of at least a portion of an example implementation of apparatus according to one or more aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity, and does not in itself dictate a relationship between the various embodiments and/or configurations discussed.

FIG. 1 is a schematic view of at least a portion of an example implementation of apparatus according to one or more aspects of the present disclosure. The schematic view illustrates at least a portion of an example implementation of a wellsite system 100 at an oilfield wellsite 102. The depicted implementation provides an example environment to control a characteristic of a cement slurry according to one or more aspects of the present disclosure, such as to install cement 103 securing a casing/liner 105 within a wellbore 104. However, other implementations are also within the scope of the present disclosure, such as placing cement plugs and performing remedial cementing procedures at the wellsite 102.

The wellbore 104 extends from a terrain surface of the wellsite 102, and a partial sectional view of a subterranean formation 106 penetrated by the wellbore 104 is shown below the wellsite 102. The wellbore 104 may terminate with a wellhead 108. The wellsite system 100 may be operable to transfer various materials and additives from corresponding sources to a destination location for blending or mixing and eventual injection into the wellbore 104 during wellbore cementing operations.

The wellsite system 100 comprises a cement mixing and pumping unit (referred to hereinafter as a "cementing unit") 110 fluidly connected with one or more tanks 112 and an additive container 114. The tanks 112 contain a base fluid, which may be or comprise fresh water, brine, and/or mud. The container 114 may contain liquid or solid chemicals or additives operable to treat the base fluid. The additives may be or comprise accelerators, retarders, fluid-loss additives, dispersants, extenders, weighting agents, and/or lost circulation additives, among other examples. The cementing unit 110 is operable to receive the base fluid and one or more of the additives via fluid conduits 116, 118, and mix or otherwise combine the base fluid and the additives to form a mixed fluid.

The wellsite system 100 may further comprise a bulk container 120, which may contain a bulk material that is substantially different than the additives contained by the additive container 114. For example, the bulk material may be or comprise a cement powder or bulk cement, among other examples. The cementing unit 110 may be operable to receive the bulk cement from the bulk container 120 via a conduit or other material transfer device (hereafter simply "conduit") 122, and mix or otherwise combine the mixed fluid and the bulk cement to form a mixture, which may be or comprise that which is known in the art as a cement slurry. The cementing unit 110 may then discharge or pump the cement slurry into the wellbore 104 via one or more fluid conduits 124 and/or the wellhead 108. The one or more fluid conduits 124 may be or comprise at least a portion of that which is known in the art as a treating line.

The wellsite system 100 may further comprise a batch mixer 126 operable to receive and mix predetermined quantities of the base fluid, additives, and/or bulk cement to form predetermined quantities or batches of the mixed water and/or cement slurry. If utilized to store the mixed water, the mixed water may be communicated to the cementing unit 110 via a fluid conduit 128 to be mixed with the bulk cement to form the cement slurry. If utilized to store the cement slurry, the cement slurry may be communicated to the cementing unit 110 via the fluid conduit 128 and pumped by the cementing unit 110 into the wellbore 104 via the fluid conduit 124 and/or the wellhead 108.

The wellsite system 100 may also comprise a control/power center 130, such as may be operable to provide control and/or centralized electric power distribution to one or more pieces of wellsite equipment or portions of the wellsite system 100. The control/power center 130 may be operable to monitor and control at least a portion of the wellsite system 100 during cementing operations. For example, the control/power center 130 may be operable to monitor and control one or more portions of the cementing unit 110, as well as pumps and/or conveyers (not shown) for moving the fluids, materials, and/or mixtures described above to and from the cementing unit 110. The control/power center 130 may comprise an engine-generator set, such as a gas turbine generator, an internal combustion engine generator, and/or other sources of electric power. Electric power and/or control signals may be communicated between the control/power center 130 and other wellsite equipment wirelessly and/or via electric conductors (not shown).

The cementing unit 110, the additive container 114, the bulk container 120, the batch mixer 126, and/or the control/power center 130 may each be disposed on corresponding trucks, trailers, and/or other mobile carriers 111, 115, 121, 127, 131, respectively, such as may permit their transportation to the wellsite 102. However, the cementing unit 110, the additive container 114, the bulk container 120, the batch mixer 126, and/or the control/power center 130 may be skidded or otherwise stationary, and/or may be temporarily or permanently installed at the wellsite 102.

FIG. 1 depicts the wellsite system 100 as being operable to form fluids and/or mixtures that may be pressurized and individually or collectively injected into the wellbore 104 during wellbore cementing operations. However, it is to be understood that the wellsite system 100 may be operable to mix and/or produce other mixtures and/or fluids that may be mixed by the cementing unit 110 and injected into the wellbore 104 during other oilfield operations, such as drilling, hydraulic fracturing, acidizing, chemical injecting, and/or water jet cutting operations, among other examples. While the cement slurry mixing and injecting operations as described herein will be described in the environment of the wellsite system 100, it is to be understood that a cement slurry mixing and injecting operation may be employed during other oilfield operations, such as drilling, cementing, acidizing, chemical injecting, fracturing, and/or water jet cutting operations, among other examples, and other job site operations.

To accomplish automated mixing of a cement slurry, a controller may be constructed with human machine interface (HMI) software that permits automated cement mixing equipment to interface with system controllers and to communicate with other systems for data sharing and logging. The HMI software also provides a user interface for a field specialist to operate a cementing unit. The controller is constructed with controller firmware that is used to run automation algorithms that permit control and monitoring of instrumentation in the cementing unit. The controller is constructed with hardware that includes HMI computers and enclosure assemblies that contain processors, memory, remote input/output devices, and related components. The controller is coupled to external components such as cables, sensors, actuators, flowmeters, pressure sensors, temperature sensors, pumping rate sensors, and densitometers.

Figure 2:
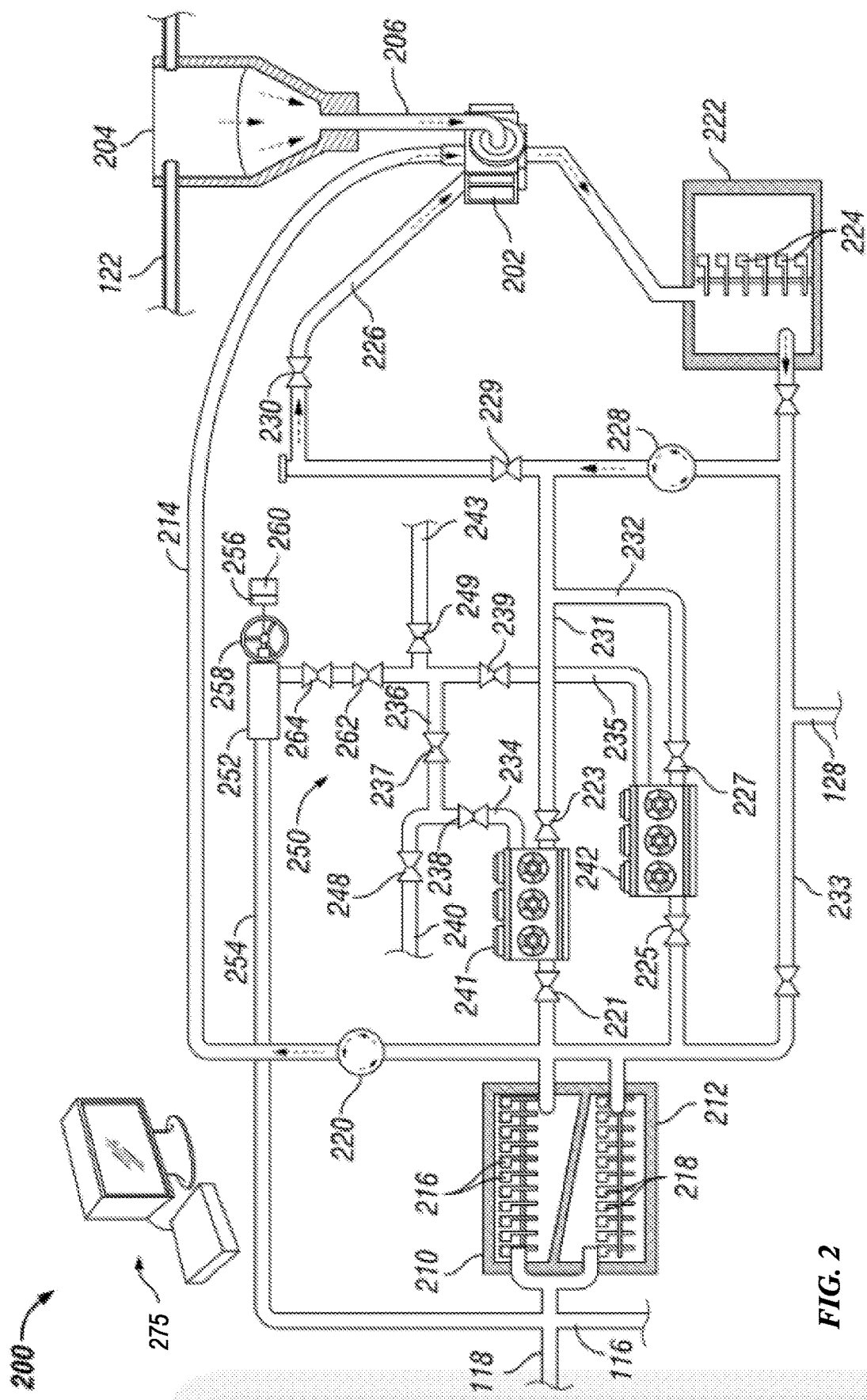
FIG. 2 is a schematic view of an example implementation of a portion of the apparatus shown in FIG. 1 according to one or more aspects of the present disclosure.

FIG. 2 is a schematic view of an example implementation of a portion of the apparatus shown in FIG. 1 according to one or more aspects of the present disclosure. More specifically, illustrated is an example implementation of a cementing unit 200 that may be employed at a wellsite according to one or more aspects of the present disclosure. The wellsite may be the wellsite depicted in FIG. 1, among other examples within the scope of the present disclosure.

The cementing unit 200 comprises a mixer 202 operable to receive and mix or blend cement and fluid to form the cement slurry described above. The mixer 202 may be a vortex type mixer or another mixer operable to mix or blend liquids and solids. The mixer 202 may receive bulk cement or cement materials from a container 204, which may temporarily store and/or direct the cement materials received from a bulk container, such as from the container 120 via conduit 122 shown in FIG. 1. The cement materials may be transferred to the mixer 202 via a material transfer conduit 206, which may comprise a volumetric or mass dry metering device (not shown) operable to control the volumetric or mass flow rate of the cement materials into the mixer 202. The metering device may include a metering feeder, a screw feeder, an auger, a conveyor, and/or the like.

The mixer 202 may receive fluid from displacement tanks 210, 212 via a fluid conduit 214. Each of the displacement tanks 210, 212 may receive additives from the additive container 114 via the fluid conduit 118 and the base fluid from the tanks 112 via the fluid conduit 116, as also shown in FIG. 1. Within each of the displacement tanks 210, 212 a plurality of mixing blades or other agitators 216, 218 may agitate the mixture to uniformly blend the additives with the base fluid. Each of the displacement tanks 210, 212 may be or comprise a continuous flow channel or pathway for communicating or conveying the additives and the base fluid mixture over a period of time sufficient to permit adequate blending to occur. Each displacement tank 210, 212 may have a first-in-first-out (FIFO) mode of operation, and may comprise a vessel-type outer housing enclosing a receptacle having an elongated flow pathway or space operable to store and communicate the mixture therethrough. Metering systems (not shown), such as metering pumps and/or metering valves, may control the flow rate at which the additives and the base fluid are introduced into the displacement tanks 210, 212.

The cementing unit 200 may also include one or more devices operable to pump and/or meter the mixed fluid from the displacement tanks 210, 212 to the mixer 202 via the fluid conduit 214. For example, the cementing unit 200 may include an injection pump 220 operable to pump the mixed fluid from the displacement tanks 210, 212 to the mixer 202. The injection pump 220 may be a metering pump, such as may be operable to control the flow rate at which the mixed fluid is introduced into the mixer 202. The injection pump 220 may be a centrifugal or other type of fluid pump. The cementing unit 200 may also comprise a metering valve (not shown) along the fluid conduit 214, such as may be operable to control the flow rate at which the mixed fluid is introduced into the mixer 202.

A controller 275 may be operable to monitor and control one or more operations of the cementing unit 200. The controller 275 may be in communication with the various metering valves, metering pumps, and other metering systems described above to adjust or otherwise control density and solids fraction of the mixed fluid, the cement slurry, and/or other mixtures. For example, the controller 275 may be operable to control the volumetric flow rates at which the base fluid and the additives are introduced into the displacement tanks 210, 212, such as to control the concentration of the mixed fluid. The controller 275 may further control the volumetric flow rates at which the bulk cement and the mixed fluid are introduced into the mixer 202, such as to control density and solids fraction of the cement slurry.

The cement slurry may be selectively discharged from the mixer 202 and received by a mixing tank 222. The mixing tank 222 may comprise mixing blades or other agitators 224 operable to agitate the cement slurry to further blend the base fluid and bulk cement. The mixing tank 222 may be or comprise a continuous flow channel or pathway for communicating or conveying the cement slurry over a period of time sufficient to permit adequate blending to occur, such that the cement slurry may reach a predetermined level viscosity and/or comprise other properties. The mixing tank 222 may have a FIFO mode of operation, and may comprise a vessel-type outer housing enclosing a receptacle having an elongated flow pathway or space operable to store and communicate the cement slurry therethrough.

The cement slurry may be selectively recirculated through the mixer 202 via a recirculation flow path 226 comprising one or more fluid conduits. Recirculation of the cement slurry may be performed, for example, to perform additional blending of the cement slurry and/or to introduce additional base fluid or bulk cement to the cement slurry, such as to change the composition and/or properties of the cement slurry. Flow control valves 229, 230 may be selectively opened to permit the cement slurry to recirculate through the recirculation flow path 226. During recirculation, a pump 228 may be operable to recirculate or otherwise move the cement slurry through the recirculation flow path 226 from the mixing tank 222 to the mixer 202.

The cementing unit 200 may further comprise one or more high pressure pump units 241, 242 fluidly coupled to receive fluids from the displacement tanks 210, 212 and the mixing tank 222 and discharge the fluids into the wellbore 104. For example, the pump units 241, 242 may receive the mixed fluid or the cement slurry via inlet conduits 231, 232 fluidly connected with the displacement tanks 210, 212 and the mixing tank 222. A bypass conduit 233 may extend between the displacement tanks 210, 212 and the mixing tank 222, bypassing the pump units 241, 242. The bypass conduit 233 may be fluidly connected with the fluid conduit 128 and the inlet conduits 231, 232, such as may permit the mixed fluid or cement slurry from the batch mixer 126 to be received by the pump units 241, 242. Although the cementing unit 200 is shown comprising two pump units 241, 242, it is to be understood that the cementing unit 200 may include other quantities of pump units within the scope of the present disclosure.

An inlet valve 221, 223, 225, 227 may be disposed in association with each corresponding fluid inlet of each pump unit 241, 242, such as to selectively fluidly connect and disconnect each pump unit 241, 242 from the mixing tank 222, the displacement tanks 210, 212, and/or other portions of the cementing unit 200. For example, the inlet valves 221, 223 may be coupled along the inlet conduit 231 on opposing sides of the pump unit 241. Similarly, the inlet valves 225, 227 may be coupled along the inlet conduit 232 on opposing sides of the pump unit 242.

The cementing unit 200 may further comprise outlet conduits 234, 235, each fluidly connected with a corresponding fluid outlet of each pump unit 241, 242. Each outlet conduit 234, 235 may include a corresponding fluid outlet valve 238, 239, which may selectively fluidly connect and disconnect each pump unit 241, 242 from the wellbore 104 and/or other portions of the cementing unit 200 located downstream from the fluid outlet valves 238, 239. The outlet conduits 234, 235 may be fluidly connected with each other via an intermediate or joining conduit 236. A fluid isolation valve 237 may be disposed along the joining conduit 236 to selectively fluidly connect and disconnect the outlet conduits 234, 235. The output conduits 234, 235 and the joining conduit 236 may be or comprise at least a portion of that which is known in the art as a treating or discharge manifold 250.

The outlet conduit 234 may be fluidly connected with a fluid conduit 240, which may be or form a portion of the fluid conduit 124 to fluidly couple the pump unit 241, and perhaps the pump unit 242, with the wellbore 104. The fluid conduit 240 may be or comprise at least a portion of that which is known in the art as a cement line 240, which may be utilized to inject the cement slurry into the wellbore 104 during cementing operations. The outlet conduit 235 may be fluidly connected with a fluid conduit 243, which may form a portion of the fluid conduit 124 to fluidly couple the pump unit 242, and perhaps pump unit 241, with the wellbore 104. The fluid conduit 243 may be or comprise at least a portion of that which is known in the art as a kill line 243, which may be utilized to inject the cement slurry into the wellbore 104 during well kill operations. The outlet conduit 234 may be selectively isolated from the cement line 240 by a fluid valve 248, while the outlet conduit 235 may be selectively isolated from the kill line 243 by a fluid valve 249. The discharge manifold 250, the fluid valves 237, 238, 239, 248, 249, the cement line 240, and the kill line 243 may be or comprise that which is known in the art as treating iron or equipment.

The fluid valves 221, 223, 225, 227, 237, 238, 239, 248, 249 may be or comprise ball valves, globe valves, butterfly valves, and/or other types of fluid valves, such as may be selectively opened and closed to permit and prevent fluid flow. Each fluid valve 221, 223, 225, 227, 237, 238, 239, 248, 249 may be actuated remotely by a corresponding actuator (not shown), such as a solenoid, motor, or other electric actuator, or a fluid actuator, such as a pneumatic or hydraulic cylinder or rotary actuator. Each of the fluid valves 221, 223, 225, 227, 237, 238, 239, 248, 249 may also be actuated manually, such as by a lever (not shown).

The discharge manifold 250 may be fluidly connected with the adjustable choke valve 252, which is operable to bleed or otherwise relieve fluid pressure from the discharge manifold 250. The choke valve 252 is operable to progressively open, such as to permit the pressurized fluid within the discharge manifold 250 to relieve or otherwise flow out of the discharge manifold 250 via a relief conduit 254. The relief conduit 254 may fluidly connect the discharge manifold 250 with the displacement tanks 210, 212, such as may permit the pressurized fluid within the discharge manifold 250 to be discharged into the displacement tanks 210, 212. The choke valve 252 may be or comprise a needle valve, a metering valve, a butterfly valve, a globe valve, or another valve operable to progressively or gradually open and close to control rate of fluid flow permitted through the choke valve 252.

The choke valve 252 may be remotely progressively opened and closed by a corresponding actuator 256 operatively coupled with the choke valve 252. The choke valve 252 may also be progressively opened and closed manually via a lever or a wheel 258. The choke valve 252 includes a corresponding position sensor 260 operable to generate a signal or information indicative of an actual position of the choke valve 252 in real time. The actual positions of the choke valve 252 may include a fully-open flow position, a fully-closed flow position, and intermediate or incremental positions between the fully-open flow and fully-closed flow positions. Each intermediate position may be indicative of the amount or percentage that the choke valve 252 is open and, thus, indicative of the flow rate through the choke valve 252. The actuator 256 may be or comprise a solenoid, motor, or other electric actuator, or a fluid actuator, such as a pneumatic or hydraulic cylinder or rotary actuator. The position sensor 260 may be or comprise a proximity sensor, such as a capacitive sensor, an inductive sensor, a magnetic sensor, a Hall effect sensor, and/or a reed switch, among other examples. The position sensor 260 may also or instead include a linear position sensor, such as a linear potentiometer. The position sensor 260 may also or instead include a rotary position sensor, such as an encoder, a rotary potentiometer, a synchro, a resolver, and/or a rotary variable differential transformer (RVDT), among other examples.

The cementing unit 200 may further comprise bleed valves 262, 264, fluidly connected in series between the pump units 241, 242 and the choke valve 252. The bleed valves 262, 264 may be disposed along the outlet conduit 235 and may be operable to selectively fluidly connect and disconnect the choke valve 252 from the discharge manifold 250. The bleed valves 262, 264 may be or comprise ball valves, globe valves, butterfly valves, and/or other types of fluid valves, such as may be selectively opened and closed to permit and prevent fluid flow.

The controller 275 may be operable to monitor and control additional operations of the cementing unit 200. For example, the controller 275 may be operable to monitor and control one or more portions of the mixer 202, the mixing tank 222, the displacement tanks 210, 212, the pumps 220, 228, the pump units 241, 242, and the fluid valves 221, 223, 225, 227, 237, 238, 239, 248, 249, 252, 262, 264, such as to control fluid pressure, fluid flow rates, and/or otherwise control movement of the base fluid, mixed fluid, the cement slurry, and/or other fluids to implement the example methods and/or processes described herein. The volumetric flow rates of a cement slurry and the mixed fluid determine the cement slurry density and solids fraction. An adjustment of either of the flow rates, changes the cement slurry density and the solids fraction. Mix fluid generally comprises a base fluid and a liquid additive. For clarity, unless described otherwise, the base fluid, mixed fluid, the cement slurry, and/or other fluids may be collectively referred to hereinafter simply as "a fluid."

Figure 3:
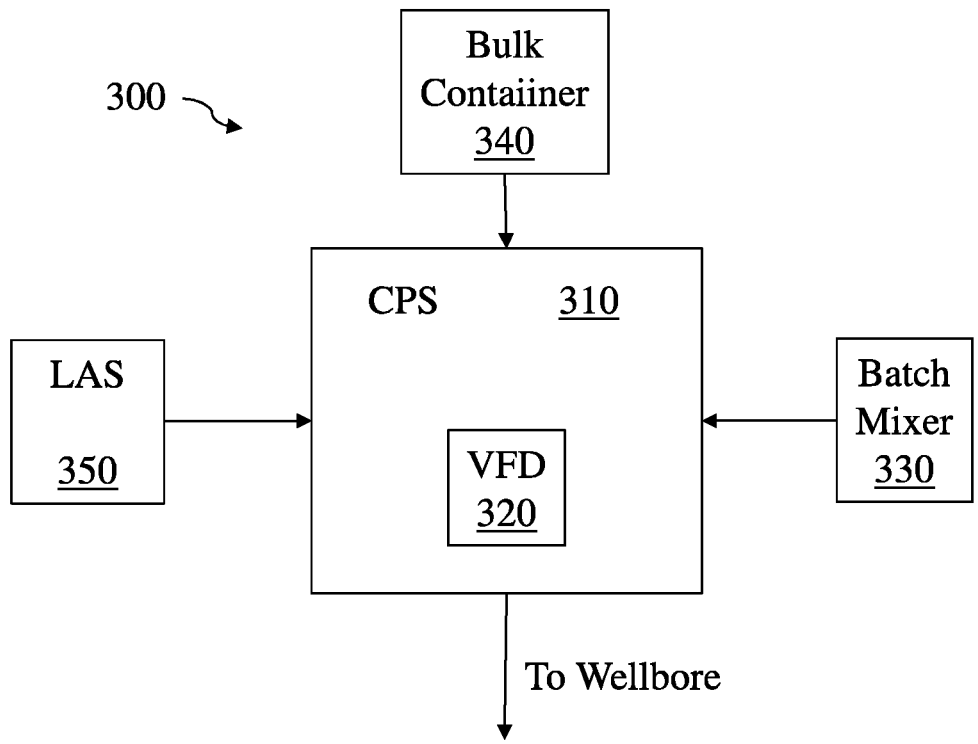
FIGS. 3 and 4 are block diagrams of at least a portion of an example implementation of apparatus according to one or more aspects of the present disclosure.

FIG. 3 is a block diagram of at least a portion of an example implementation of apparatus according to one or more aspects of the present disclosure. More specifically, illustrated is an example implementation of a cementing unit 300 that may be employed at a wellsite according to one or more aspects of the present disclosure. The cementing unit 300 includes a cement pumping skid (CPS) 310 formed with a variable frequency drive (VFD) 320 that powers main motors and is coupled to a batch mixer 330 that produces a cement slurry that can be fed down a wellbore. The main motors are employed to pump the cement with different speeds. The cement slurry is formed by mixing cement from a bulk container 340 with a mix fluid that comes from a liquid additive system (LAS) 350 or an additive container. The liquid additive system 350 injects liquid chemicals into a base fluid at given concentrations defined by a recipe. The base fluid and additives make a mix fluid. Delivery rate of the additives is known as the mix fluid rate. The batch mixer 330 provides low pressure slurry mixing at high precision and stores mix water or slurry. The volumetric flow rates of the cement blend and the mix fluid determine the cement slurry density and solids fraction. An adjustment of either of these flow rates changes the cement slurry density and solids fraction. The cement blend flow can be pneumatically or gravitationally actuated. A centrifugal pump provides the mix fluid flow.

Figure 4:
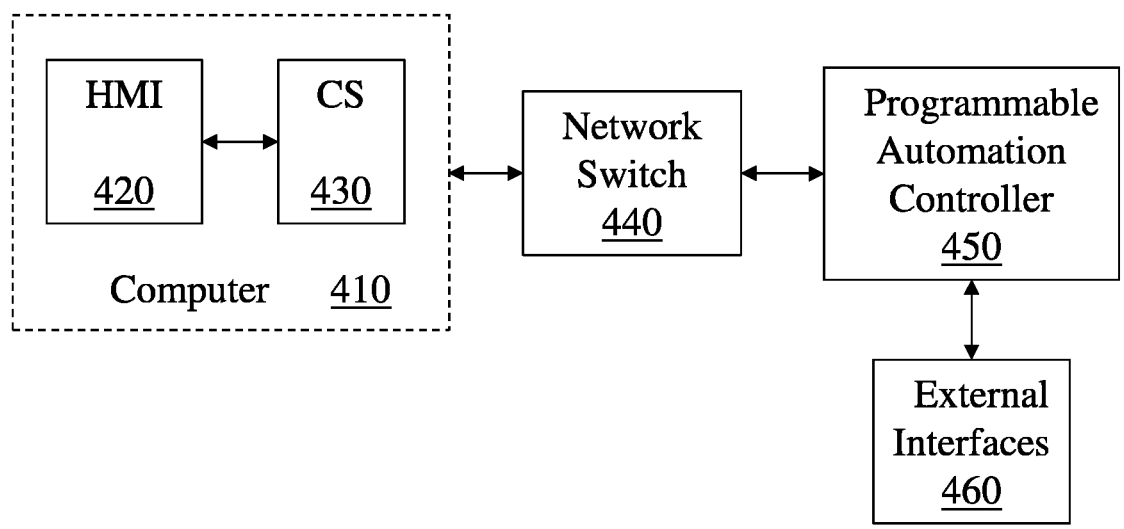

FIG. 4 is a block diagram of at least a portion of an example implementation of apparatus according to one or more aspects of the present disclosure. More specifically, illustrated is an example implementation of portions of a controller for a cementing operation that may be employed at a wellsite according to one or more aspects of the present disclosure. The controller employs a computer architecture to, without limitation, provide a cement slurry setpoint, process commands issued by an operator, and to permit the operator to monitor parameters. Within a computer 410 is a human machine interface (HMI) 420 and communications server (CS) 430 that permits communication between HMI software and controller software. The computer architecture permits access to sensor data and transfer of commands between HMI software and controller software. The computer 410 communicates with a network switch 440 using, for instance, a Modbus employing transmission control protocol/Internet protocol (TCP/IP) over an Ethernet physical layer. The network switch 440 communicates with programmable automation controller (PAC) 450 that runs firmware that acquires sensor data and permits control over system elements such as motors, valves, and actuators employing feedback gains that are adjusted within the PAC 450. For example, the firmware permits an operator to move a gate of a valve with an adjustable gain in response to a sensed error. The PAC 450 is coupled to sensors, valves, etc., through external interfaces 460.

Figure 5:
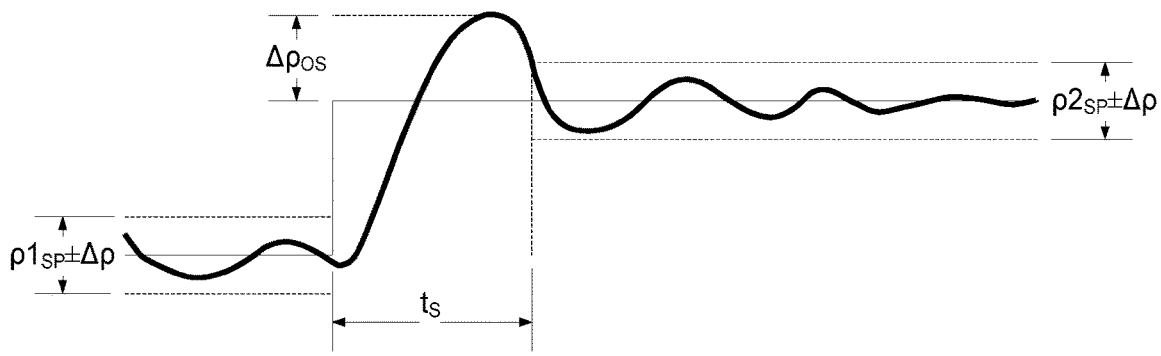
FIGS. 5 and 6 are waveform diagrams of density and solids fraction, respectively, of a cement slurry according to one or more aspects of the present disclosure.
Figure 6:
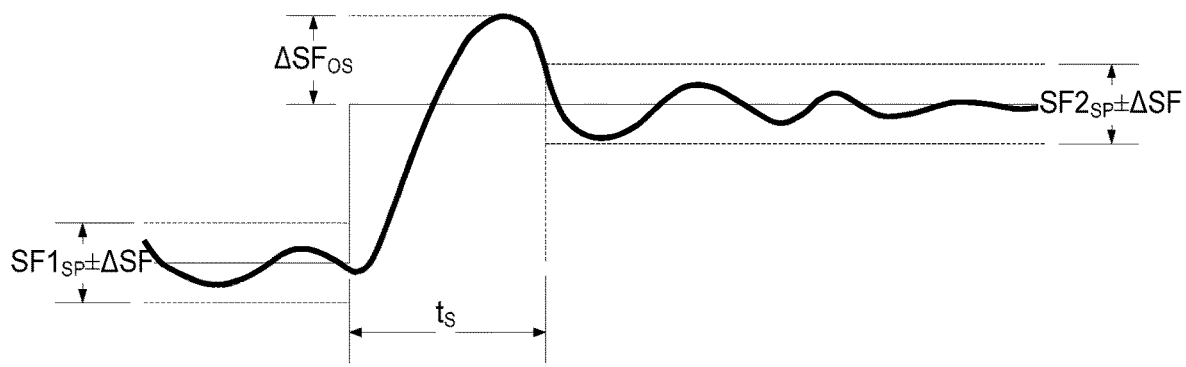

FIGS. 5 and 6 are waveform diagrams of density and solids fraction, respectively, of a cement slurry according to one or more aspects of the present disclosure. FIG. 5 illustrates a density overshoot $\Delta\rho_{OS}$ and settling time $t_S$ for a density setpoint change $\Delta\rho$ of a cement slurry. The final density setpoint is $\rho 2_{SP}$. FIG. 6 illustrates a solids fraction overshoot $\Delta SF_{OS}$ and settling time $t_S$ for a solids fraction change $\Delta SF$ of a cement slurry. The beginning density and solids fraction setpoints $\rho 1_{SP}$, $SF1_{SP}$ are for lead cement. Then there is a transition period to the final density and solids fraction setpoints $\rho 2_{SP}$, $SF2_{SP}$, which are tail cement. The ideal case is for the variation in the changes in density $\Delta\rho$ and solids fraction $\Delta SF$ and transition time $t_S$ to be zero.

Figure 7:
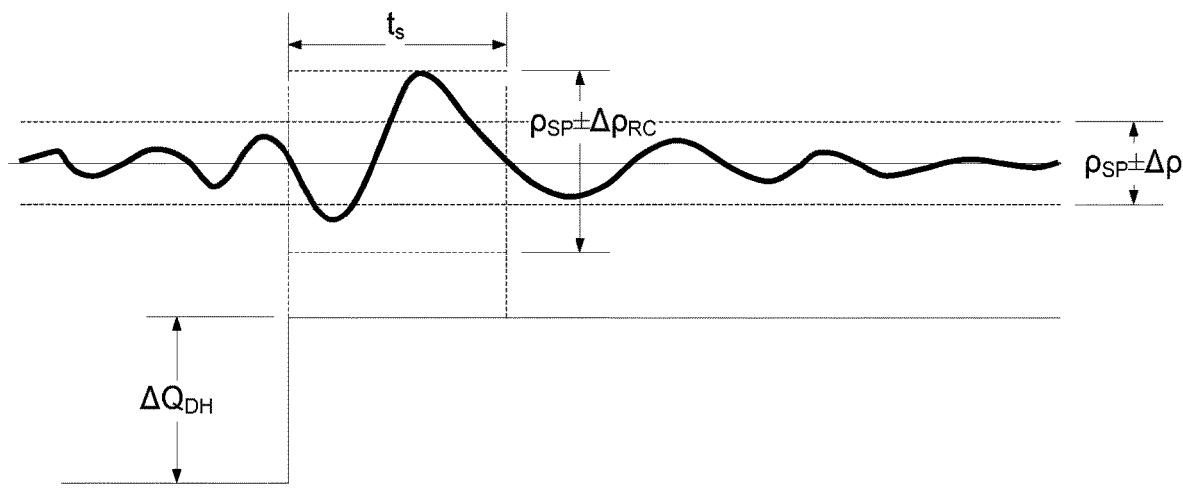
FIGS. 7 and 8 are waveform diagrams of density and solids fraction overshoot and settling time, respectively, for a rate setpoint change of a cement slurry according to one or more aspects of the present disclosure.
Figure 8:
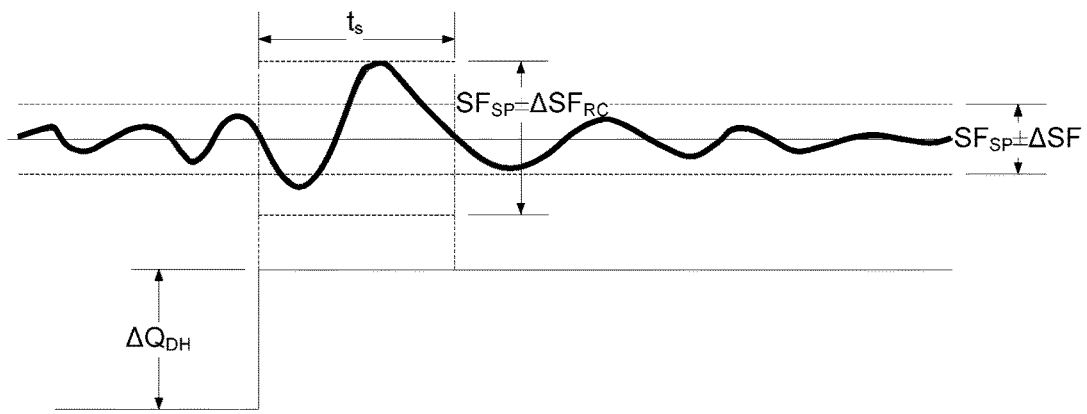

FIGS. 7 and 8 are waveform diagrams of density and solids fraction overshoot and settling time, respectively, for a flow rate setpoint change of a cement slurry according to one or more aspects of the present disclosure. FIG. 7 illustrates a density overshoot and settling time $t_S$ of a density setpoint $\rho_{SP}$ of a cement slurry taking into account a change in density $\Delta\rho_{RC}$ after a flow rate change $\Delta Q_{DH}$. FIG. 8 illustrates a solids fraction overshoot and settling time $t_S$ of a solids fraction setpoint $SF_{SP}$ of a cement slurry taking into account a change in solids fraction $\Delta SF_{RC}$ after a rate change $\Delta Q_{DH}$. Similar to the changes illustrated in FIGS. 5 and 6, during cement mixing operations the rate at which cement is mixed should be changed from time to time during the job, and this causes variations in density and solids fraction as shown in FIGS. 7 and 8. The ideal case is for the variation in density $\Delta\rho$, $\Delta\rho_{RC}$, the variation in solids fraction $\Delta S_F$, $\Delta SF_{RC}$, and settling time $t_S$ to be zero. In reality, there are many challenges to be accounted by a mixing control system in order to approach ideal cement mixing.

The volumetric flow rate of a cement slurry can thus fluctuate during a cementing operation. Multiple silos/air bottle tanks or trucks (ABTs) that employ pressurized air to feed dry cement (e.g., in a land operation) may be used during one cementing operation, and an operator will switch between them while pumping a cement slurry. When one silo/ABT is about to be exhausted of its contents, the cement slurry generally accumulates on the walls of the silo/ABT, and field personnel generally hammer on the silo/ABT to permit the remaining cement slurry to drop to bottom of the silo/ABT to be consumed. This is one of the cases that provide the largest fluctuation in volumetric flow rate of a cement slurry.

The cement slurry is transported to the cementing unit from the silo/ABT in response to pneumatic pressure. The pneumatic pressure is varied during a job in order to account for the configurations of the silos/ABTs that are being used. Sometimes multiple silos/ABTs are connected in a daisy chain and the pressure is adjusted while the silos/ABTs are drained.

While mixing lead or tail cement, if the density or solids fraction setpoints are not changed, then the control system benefits from reduced process sensitivities. As a result, small corrections in these characteristics drive the variations in density and solids fraction of the cement slurry to about zero. While transitioning from lead to tail cement, if the density or solids fraction setpoint are changed, then the control system benefits from increased process sensitivities, so large corrections drive the time experienced to transition from lead cement to tail cement to about zero.

While transitioning from one cement slurry rate setpoint to another, then the control system benefits from increased process sensitivity at the beginning of the transition, so large corrections can drive the time experienced to settle towards zero. However, after a cement slurry rate setpoint transition is complete, the control system benefits from gradually reduced process sensitivities, such that small corrections can drive the variations in density and solids fraction experienced to about zero. An averaging process may be employed for improved control of downhole cement slurry density.

The control system firmware implements a control loop to achieve ±0.1 pounds per gallon (ppg) density control on downhole cement slurry. This is done by feeding back downhole density to a mixing algorithm so that the mixing algorithm can compensate as intended. One mechanism for compensating is to calculate a total density for the volume that has been mixed, but not pumped and calculate its average density. The downhole density will approximate the total average mix density for the resident volume and so it can be treated as the expected downhole density. A control loop can compensate mixing to maintain expected downhole density within 0.1 ppg with looking at actual downhole density for validation.

The control system is designed with mixing quality accuracy of ±0.2 ppg. If the variations within 0.2 ppg are like a sine wave, then the average would be substantially zero. The averaging tub provides the averaging for the control process. Thus, if the variations within mixing are 0.2 ppg like a perfect sine wave, then the pumping matching setpoint would be substantially perfect (i.e., 100 percent). In practice, density does not act line a sine wave within 0.2 ppg, and so the average could range between 0.2 above or below a setpoint. If the average is calculated and it is observed that estimated downhole density is 0.2 ppg above the setpoint, compensation can be achieved by lowering the target density setpoint by 0.2 ppg. Thus, the cement slurry could be at 0.2 ppg below the density setpoint and this would average out with the 0.2 ppg above setpoint in the tubs resulting in downhole density within 0.1 ppg.

As introduced herein, to accommodate and accelerate changes in reaction time during a cement slurry mixing operation, the control system employs a cascaded proportional-integral-derivative (PID) control-loop feedback mechanism to target the control behavior. The control system uses errors observed between the density or solids fraction setpoints, and the acquired values drive changes in the volumetric flow rates of the cement blend and the mix fluid.

The PID control loops exhibit different behaviors due to variations in gain parameters that can be used. A proportional gain causes the PID control loop to command error corrections in proportion to the size of the error. An integral gain causes the PID control loop to command error corrections in proportion to an error accumulated over time. A derivative gain causes the PID control loop to command error corrections in proportion to a rate of change of the error. Improved gain settings that accomplish control behavior substantially closer to model behavior can vary throughout a cement mixing operation due to variations in ambient temperature, age of the cement slurry, pressure at a terminal end, etc. The control system introduced herein makes use of several techniques that continuously or otherwise continually adjust gain settings to achieve enhanced controller behavior.

The PID gains may be changed adaptively. Each of the proportional (P), integral (I), and derivative (D) gains is varied continuously (or continually) through the cement mixing operation. A gain can be either increased or decreased. The impact of the change in gain on the error is used to determine the next change in the gain value. If a gain is increased and the error decreases, then the next change will also be an increase. However, if a gain is increased and the error increases then the next change will be a decrease. Similarly, if a gain is decreased and the error decreases, then the next change will also be a decrease. However, if a gain is decreased and the error increases, then the next change will be an increase.

A statistical algorithm is used to model the cementing operation and learn from historical data to improve and reduce the experienced errors produced by the control system, thereby enabling the PID gains to be learned employing a machine-learning process. Toward this end, a database is created that contains historical values of gains and cementing parameters used to describe the state of the system, as well as the resulting errors between setpoints and acquired values. The machine-learning process acquires cementing parameters to identify a current state of the cementing unit and control system, and based on previous use of gains makes a selection for a set of new gains that will result in reduced errors.

For example, the machine-learning process may determine that a certain state of the cementing unit such as a particular cement slurry density and flow rate operates with improved performance with a certain set of gains. When that certain cement slurry density and flow rate is sensed, or a state close to that system state, the control system can immediately deploy that certain set of historical gains, thereby improving performance. The database can be continually updated with latest values.

A deep-learning statistical algorithm can also be used to find features in the cementing operation that can be used to improve the machine-learning process in order to reduce the experienced control error. The goal of the deep-learning statistical algorithm is to identify features that will further improve the decision making process. For example, a deep-learning statistical algorithm can determine that a change in mix water rate is associated with just a subset of the cementing parameters and the mix water rate impacts just a subset of the PID gains. At which point, once the mix water rate setpoint is changed, just associated parameters are used to calculate patterns on relevant data subsets and arrive to the solution in both a quicker timeframe and permitting more extensive analysis of relevant data.

As another example, the deep-learning statistical algorithm can determine that a certain linear combination of gains or gain changes produces no or little observable improvement in errors. As a result, such linear combination of gains or gain changes can be eliminated in a search or adjustment process in a controller for changing gains to reduce an error in the cement slurry. Alternatively, certain linear combinations of gains or gain changes can be identified by the deep-learning statistical algorithm that provides improvement in errors.

To describe further details about gain types, the control system can select PID gains, without limitation, for one or more of the following features: a proportional gain the specifies the proportional gain of the controller; an integral gain that specifies the integral time; a derivative gain that specifies the derivative time; a disturbance rejection gain that specifies relative emphasis of disturbance rejection to setpoint tracking; a linearity gain that specifies linearity of the error response; a filter gain that specifies a derivative filter time constant (increasing this value increases damping of derivative action); and a weight gain that specifies an amount by which to weight an error applied to the derivative action.

Describing further the gain variation process during adaptively driven gain selection, a set of conditions is gathered with a list of gains for each type of cement job design, with different gain values tailored for optimum or otherwise improved performance due to one or more of a target cement blend, target mix rate, target job volume, target chemical additives, target slurry temperature, target density, and target solids fraction. The set of conditions also includes provisions for optimal or otherwise improved set of gains during each stage of the cementing operation such as build-up mixing, lead cement mixing, lead-to-tail transition mixing, and tail cement mixing. The set of conditions also includes provisions for an optimal or otherwise improved set of gains that may be dependent on cementing parameters such as actual slurry temperature, actual slurry density, actual solids fraction, and actual chemical concentration. The set of conditions is provided to a fuzzy logic control module in a controller that is used to identify the optimum or otherwise improved combination of gains, and provides as an output the gains to the PID loops.

A gain variation process uses machine learning gain selection including supervised learning algorithms used for the controller to learn a relationship between the input gains (e.g., P, I, D gains for a knife-gate control loop) and the input cementing parameters (e.g., mix fluid flow rate and cement density) and the output error (e.g., difference between a setpoint density and monitored density). The algorithms have access to historical data in the cementing unit that is acquired by the controller and made available from local logging at the HMI and remotely through a server. The algorithm examines available data in repositories to learn a pattern for identifying the optimum or otherwise improved set of gains. One or more of the following functions, without limitation, are used for supervised learning: k-Nearest Neighbors (k-NN); back-propagation (BP) neural network; learning vector quantization (LVQ); and support vector machine (SVM).

Figure 9:
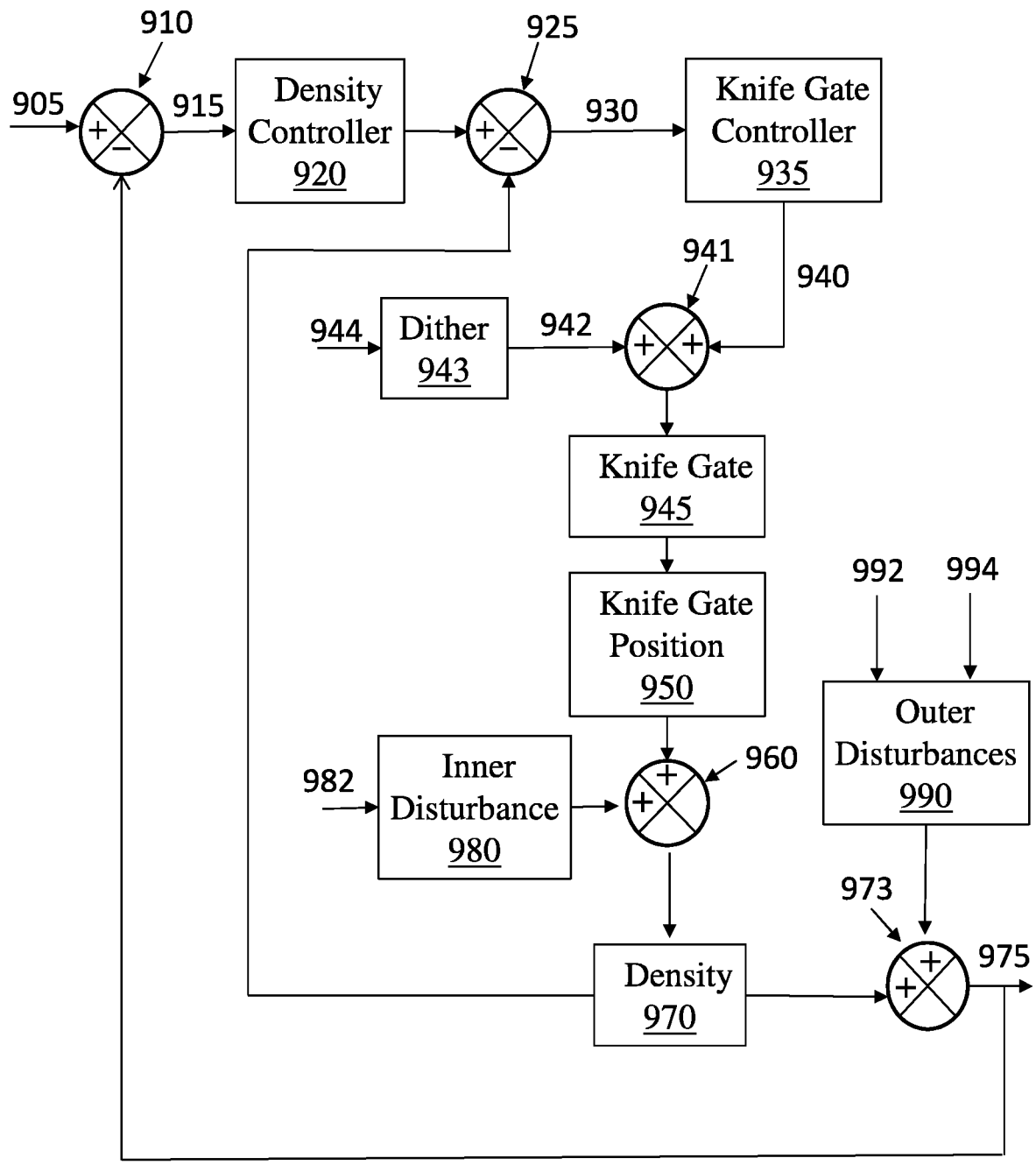
FIGS. 9-12 are block diagrams of at least portions of example implementations of apparatus according to one or more aspects of the present disclosure.

FIG. 9 is a block diagram of at least a portion of an example implementation of apparatus according to one or more aspects of the present disclosure. More specifically, illustrated is an example implementation of portions of a controller for a cementing operation that may be employed at a wellsite according to one or more aspects of the present disclosure. The controller employs a computer architecture to control a density of a cement slurry in a cementing unit. In the control system, a knife gate position controls the density of the cement slurry. In its operation, a density setpoint 905 is input to the controller, for instance, by an operator employing an HMI. The density setpoint 905 is compared in summer 910 with a process variable 975 that represents a sensed density of the cement slurry, and a density error 915 is input to a density controller 920 that, in conjunction with a summer 925, produces a knife gate setpoint 930 that is input to a knife gate controller 935. The knife gate controller 935 produces a control signal 940. The control signal 940 is then provided to a summer 941 and summed with a dither offset 942 generated by a calculation performed in a dither 943. The dither offset 942 generated by the dither 943 is calculated by combining a dither amplitude 944 with a sine wave based on a loop rate of a control algorithm. The period of the sine wave is selected to be sufficiently longer than the loop rate such that the knife gate setpoint 930 will slowly oscillate over several loop cycles to improve bulk delivery consistency. The summed value from summer 941 is then utilized to control an articulating element of a knife gate 945. The result produces a knife gate position 950, which is ultimately fed back to the summer 925. The resulting knife gate position 950 affects density of the cement slurry represented by density process 970. The result produces a cement slurry density that is sensed as the process variable 975 that is fed back to the summer 910. The density controller 920 and the knife gate controller 935 operate with gains of closed loop feedback arrangements that are changed in response to sampling an error of a respective characteristic. These actions may be performed by the programmable automation controller 450 as described above with reference to FIG. 4.

FIG. 9 also illustrates an inner disturbance 980 produced by hydraulics 982 that is inherently summed at summer 960 in the cementing operation with the knife gate position 950. In addition, outer disturbances 990 produced by sensing water flow 992 and cement slurry flow 994 are inherently summed at summer 973 with the density of the cement slurry produced in density process 970. The result is a control architecture that accepts a density setpoint 905 and controls a density of a cement slurry, recognizing that inner and outer disturbances 980, 990 of the control system can produce unintended errors in the density of the cement slurry.

Figure 10:
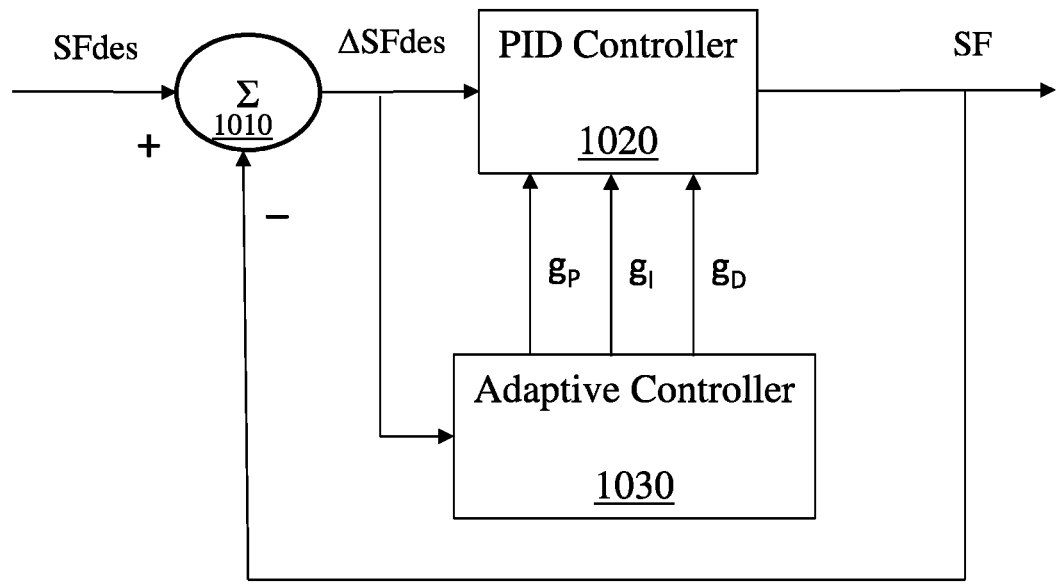

FIG. 10 is a block diagram of at least a portion of an example implementation of apparatus according to one or more aspects of the present disclosure. More specifically, illustrated is an example implementation of portions of a controller configured to control a solids fraction characteristic of a cement slurry in a cementing unit employed at a wellsite. The controller regulates the solids fraction of the cement slurry employing summer 1010 that subtracts a current solids fraction value SF from a desired solids fraction value SFdes to produce a solids fraction error ΔSFdes. The controller includes PID controller 1020 to alter an internal cementing parameter such as a knife gate or valve position to adjust the current solids fraction value SF. The PID controller 1020 is operable with proportional gain $g_P$, integral gain $g_I$, and derivative gain $g_D$. The controller is further formed with adaptive controller 1030 that is configured to adjustment one or more of the gains of the PID controller 1120 in response to sampling the solids fraction error ΔSFdes continuously or continually over time.

Figure 11:
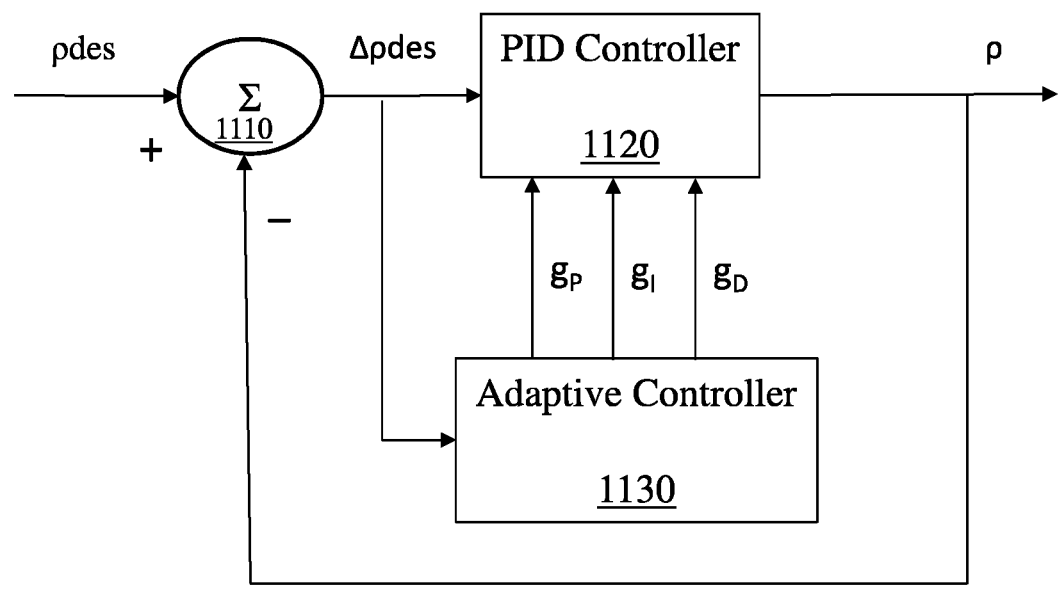

FIG. 11 is a block diagram of at least a portion of an example implementation of apparatus according to one or more aspects of the present disclosure. More specifically, illustrated is an example implementation of portions of a controller configured to control a density of a cement slurry in a cementing unit employed at a wellsite. The controller regulates the density of the cement slurry employing summer 1110 that subtracts a current density value ρ from a desired density value ρdes to produce a density error Δρdes. The controller includes PID controller 1120 to alter an internal cementing parameter such as a knife gate or valve position to adjust the current density value ρ. The PID controller 1120 is operable with proportional gain $g_P$, integral gain $g_I$, and derivative gain $g_D$. The controller is further formed with adaptive controller 1130 that is configured to adjustment one or more of the gains of the PID controller 1020 in response to sampling the density error Δρdes continuously or continually over time.

Figure 12:
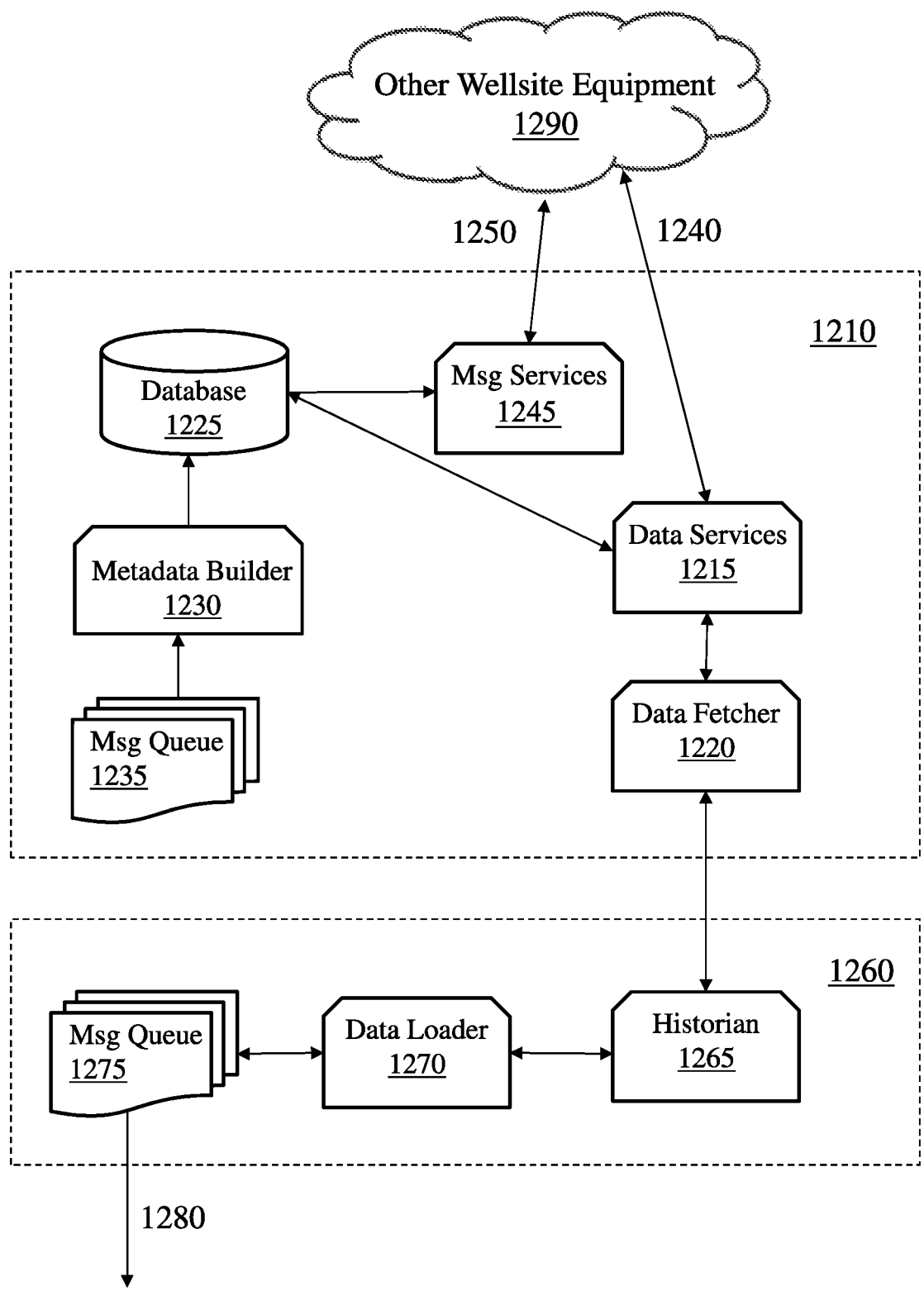

FIG. 12 is a block diagram of at least a portion of an example implementation of apparatus according to one or more aspects of the present disclosure. More specifically, illustrated is an example implementation of portions of a controller configured to accumulate and provide access to historical data that may be employed to adjust gains of the controller for a cement slurry in a cementing unit employed at a wellsite. A data front-end server 1210 that handles real-time data for a cementing and/or stimulation activity is coupled to a data historian server 1260 and to other wellsite equipment 1290 including with other vendor systems. The data front-end server 1210 provides data and integration services 1240 and notification services 1250 to the other wellsite equipment 1290.

The data historian server 1260 saves historical data of a cementing operation in a database that is employed to reduce an error of a characteristic of the cement slurry in a cementing unit such as a solids fraction or a density. A statistical algorithm is employed with the historical data to permit the controller that controls such characteristics to reduce the error. The statistical algorithm employs cementing parameters or characteristics that describe features of the cement slurry such as, without limitation, a current solids fraction and/or a density thereof to reduce the error of the characteristic. The statistical algorithm identifies such features of the cementing unit to reduce the error of the characteristic of the cement slurry. The features may include, without limitation, a mix fluid flow rate, an amount of a cement slurry additive, an age of the cement slurry, and a temperature of the cement slurry.

The data front end-server 1210 handles real-time data that is used for a cementing and/or stimulation activity includes a data services subsystem 1215 coupled to a data fetcher 1220. The data services subsystem 1215 in the data front-end server 1210 is also coupled to a database 1225 for storing cement slurry data that in turn is coupled to a metadata builder 1230 and a message queue 1235. A message services subsystem 1245 in the data front-end server 1210 provides the notification services 1250 to the other wellsite equipment 1290. The data services subsystem 1215 in the data front-end server 1210 provides the data and integration services 1240 to the other wellsite equipment 1290.

A historian subsystem 1265 in the data historian server 1260 exchanges data with the data fetcher 1220 in the data front-end server 1210. The historian subsystem 1265 in the data historian server 1260 also exchanges data with a data loader 1270 in the data historian server 1260, which in turn provides controller data 1280 (via a message queue 1275) that is exchanged with a server repository accessible to a local network. The controller data 1280 includes, for example, HMI and cementing unit control system data as well as means to provide access to maintenance tool functionalities.

Figure 13:
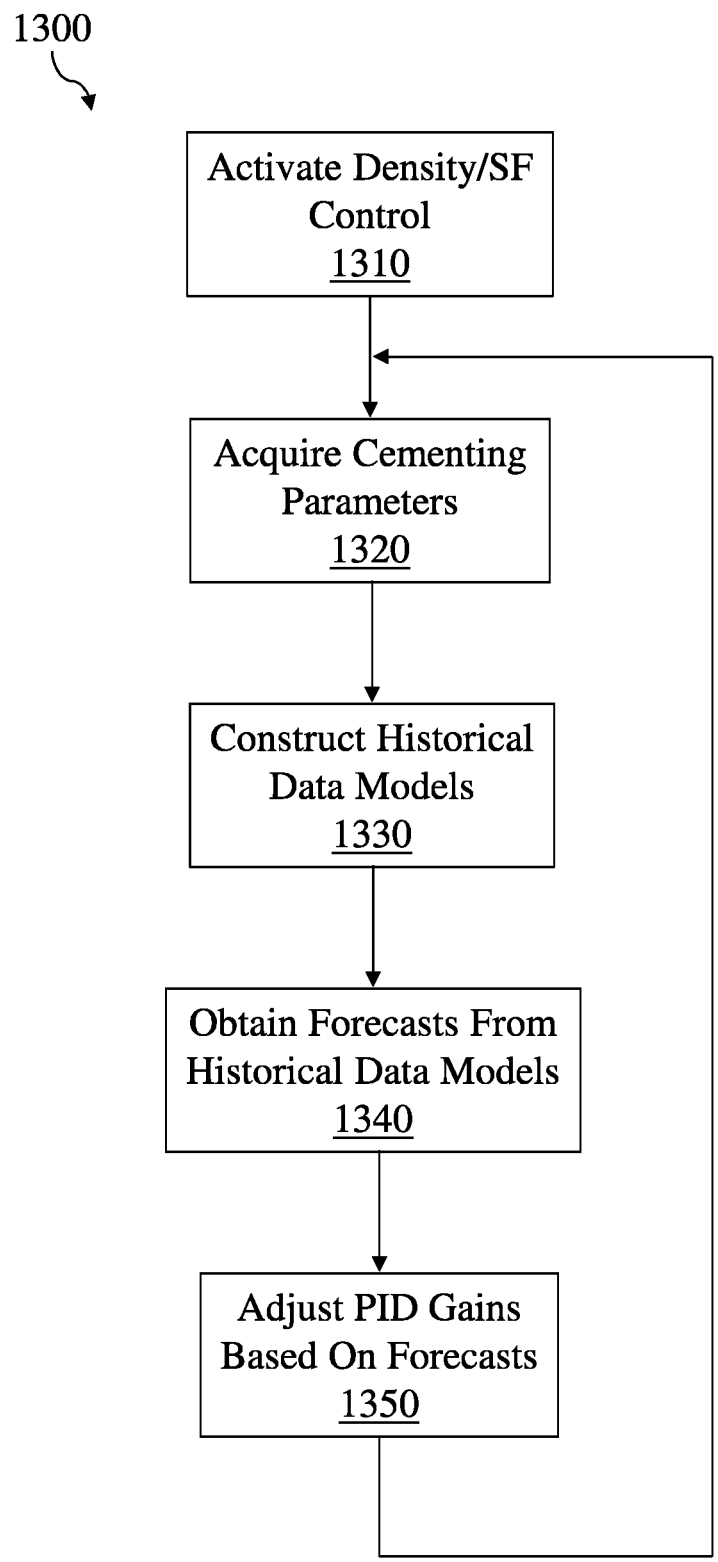
FIG. 13 is a flow-chart diagram of at least a portion of an example implementation of a method of operating a cementing unit according to one or more aspects of the present disclosure.

FIG. 13 is a flow-chart diagram of at least a portion of an example implementation of a method (1300) of operating a cementing unit according to one or more aspects of the present disclosure. The method (1300) includes activating (1310) density/solids fraction (SF) control. Cementing parameters are then acquired (1320). The acquired (1320) cementing parameters may include PID gains, mix fluid flow rate, jet valve position, thin-up valve position, knife gate position, surge can weight, mix density/SF, mix temperature, mix flow rate, mix tub level, mix age, mix additive, average tub level, downhole density/SF, downhole temperature, and downhole flow rate, among other examples also within the scope of the present disclosure.

Historical data models are then constructed (1330) using the acquired cementing parameters. The constructed (1330) historical data models may include autoregressive moving average, k-means, k medians, k-medoids, fuzzy C-means, Gaussian mixture model, hierarchical clustering, spectral clustering, vector quantization, self-organizing mapping, k-nearest neighbors, back-propagation neural network, learning vector quantization and support vector machine, among other examples also within the scope of the present disclosure. Forecasts are then obtained (1340) from the historical data models. Based on the obtained (1340) forecasts, PID gains are adjusted (1350) to reduce errors, such as a magnitude of a density/SF setpoint minus a density/SF measurement. Other error metrics may also or instead be used, such as a minimum mean-squared error metric. The method (1300) may be repeated, such as beginning with the cementing parameters acquisition (1320).

Figure 14:
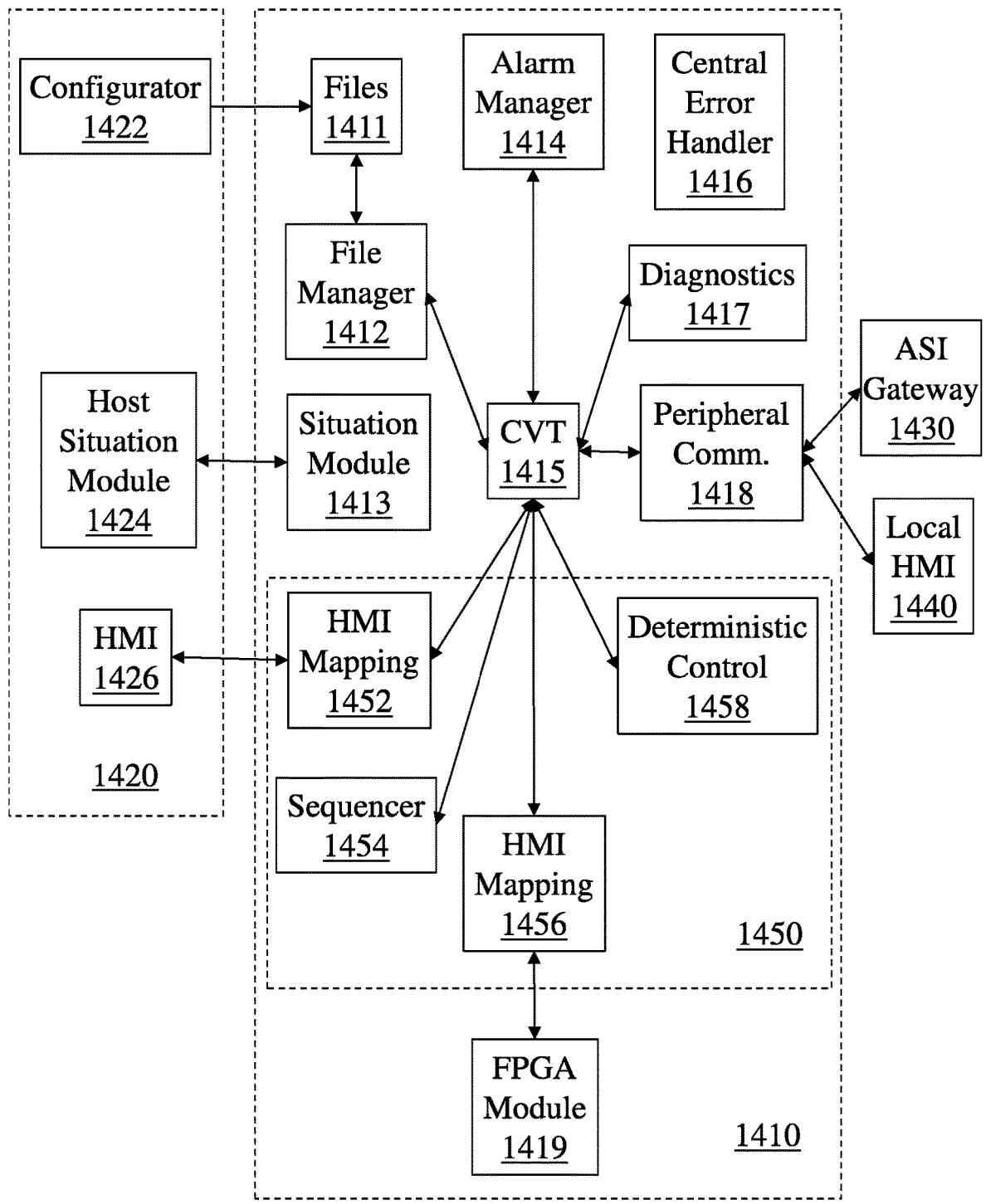
FIG. 14 is a block diagram of at least a portion of an example implementation of apparatus according to one or more aspects of the present disclosure.

FIG. 14 is a block diagram of at least a portion of an example implementation of apparatus according to one or more aspects of the present disclosure. More specifically, illustrated is an example implementation of portions of a controller showing a firmware framework. A PID implementation of an algorithm that adjusts PID gains may be performed through a firmware framework run on the controller. The firmware framework architecture provides primary services and abstract classes. Firmware code builds project-specific instances on framework primary services. A firmware application can be operated dynamically to support a wide variety of hardware implementations. The firmware framework that provides programmable automation system 1410 provides basic software services, including a file manager 1412 that communicates using a current value table (CVT) 1415 for files 1411 stored therein. The CVT 1415 is coupled to an alarm manager 1414 to provide an alarming functionality, and to a diagnostics subsystem 1417 to provide a diagnostic functionality. The CVT 1415 is also coupled to an actuator sensor interface (ASI) gateway 1430 and to a local HMI 1440 separate from the firmware for the programmable automation system 1410 via a peripheral communicator 1418. A central error handler 1416 provides a central error handling functionality for the firmware framework for the programmable automation system 1410.

The files 1411 associated with firmware for the programmable automation system 1410 are accessible to a configurator 1422 that determines which files in the file manager 1412 to download and upload in a host 1420. The host 1420 also includes a host situation module 1424 (coupled to a situation module 1413) that is configured to analyze a response characteristic of the controller for the cement slurry, and an HMI 1426 to permit human interactions.

The firmware for the programmable automation system 1410 also includes a real-time engine 1450 formed with an HMI mapping subsystem 1452 that interfaces with the HMI 1426 in the host 1420, a sequencer 1454, a deterministic control subsystem 1458, and another HMI mapping subsystem 1456 that interfaces with a field-programmable gate array (FPGA) module 1419 in the firmware for the programmable automation system 1410. The sequencer 1454 is formed with a routine that can, as an example, open selected valves in a proper order and with proper delays therebetween. The deterministic control subsystem 1458 is configured to execute high-priority control loops with appropriate processor resources in a predefined amount of time (e.g., by 100 milliseconds (ms)).

Figure 15:
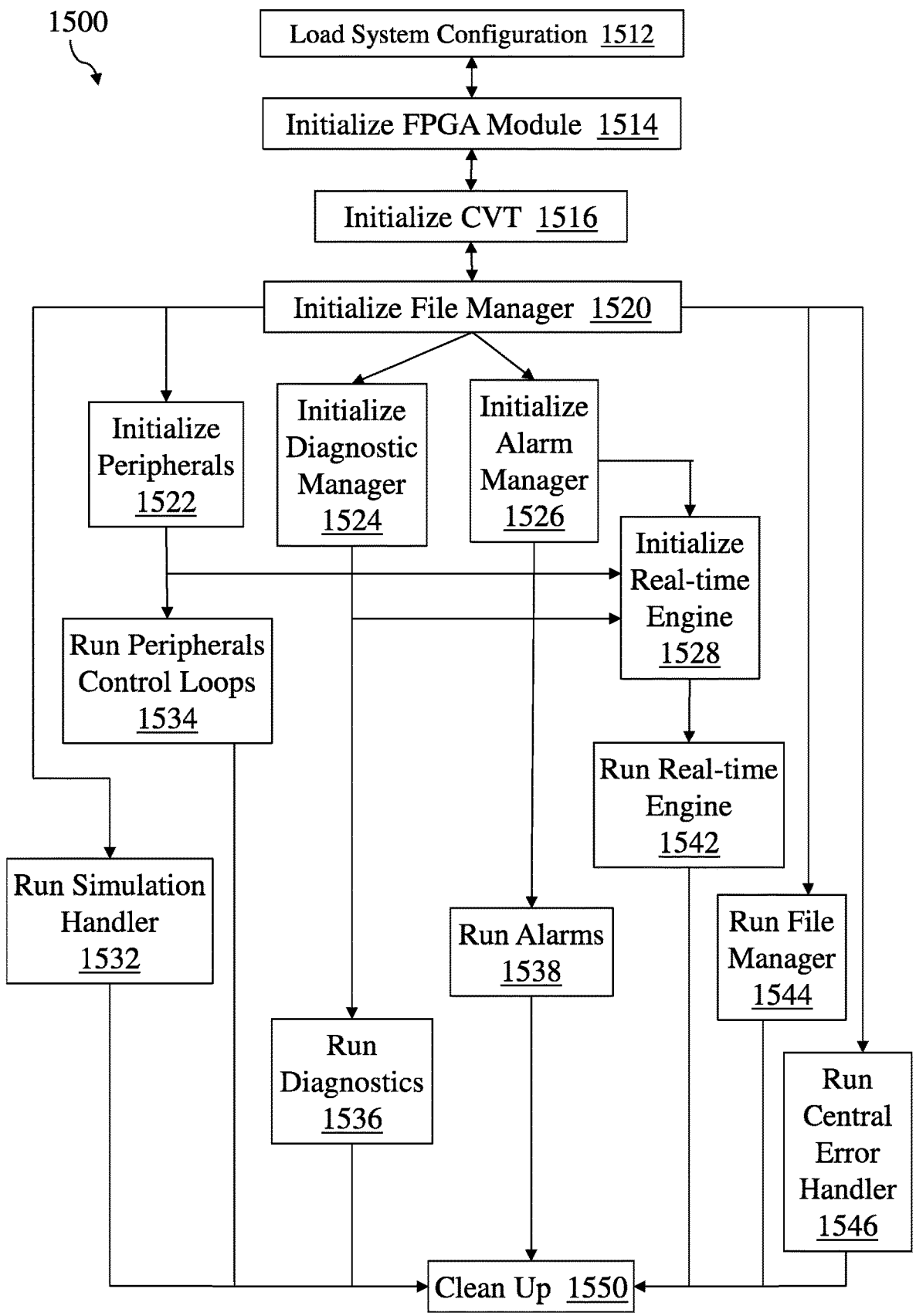
FIGS. 15-20 are flow-chart diagrams of at least portions of example implementations of methods of operating a cementing unit according to one or more aspects of the present disclosure.

FIG. 15 is a flow-chart diagram of at least a portion of an example implementation of a method (1500) of operating a cementing unit according to one or more aspects of the present disclosure. The method (1500) may include loading (1512) system configuration information, initializing (1514) a FPGA module, initializing (1516) a CVT, and initializing (1520) a file manager. Once the aforementioned modules are initialized, the method (1500) includes initializing (1522) peripherals (such as communication that is controlled and/or acquired for motors, sensors, actuators) that collectively operate employing communication through an external gateway using various protocols, initializing (1524) a diagnostic manager, initializing (1526) an alarm manager, and initializing (1528) a real-time engine.

Following the initializations, the method (1500) may include running (1532) an optional simulation handler that stores and executes instructions for testing a controller and simulates interfaces, running (1534) peripheral control loops, running (1536) diagnostics from the diagnostic manager, running (1538) alarms from the alarm manager, running (1542) the real-time engine, running (1544) the file manager, and running (1546) a central error handler. Running the real-time engine (1542) performs deterministic control and monitoring, including time-critical control and sequenced operations. Running the peripheral control loops (1534) performs non-deterministic control and monitoring operations. Running the diagnostic manager (1536) monitors the system state (e.g., communication status, controller run time, memory usage). Running the alarms (1538) monitors operational parameters according to predetermined caution and warning criteria set in the alarm manager. The modules utilized to perform the method (1500) have access to the file manager and the central error handler. Running the file manager (1544) performs maintaining of default parameter values, scaling, unit management, logging job data, and storing or accessing non-volatile information to be persistently maintained by the controller. Running the central error handler (1546) aggregates errors and warnings from the modules of the method (1500) and then classifies the errors. Once the errors are classified by the central error handler, the errors may be communicated to the modules of the method (1500) for action and passed to the file manager to be logged. A general clean-up functionality is provided (1550) following operations to perform a controlled shutdown.

Figure 16:
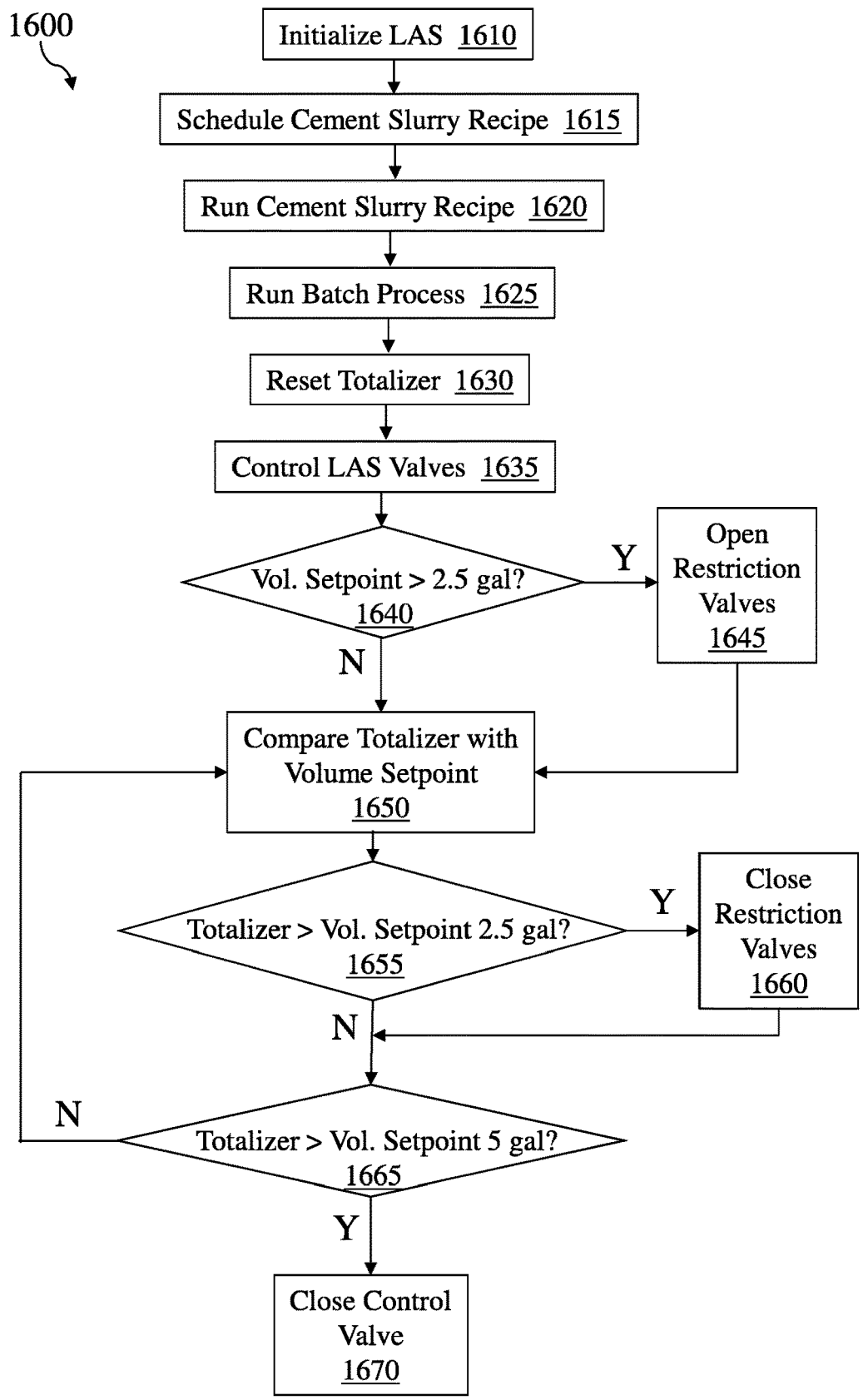

FIG. 16 is a flow-chart diagram of at least a portion of an example implementation of a method (1600) of operating a cementing unit according to one or more aspects of the present disclosure. A liquid additive system (LAS) provides the capability to edit/save a cement slurry recipe with different combinations of ingredients, and runs a cementing batch for a selected recipe. The operator can reset an auto-batch totalizer (also referred to as a "totalizer") and open and close control/restriction valves of selected LAS lines. Once execution of the LAS starts, it can begin execution of the cement slurry recipe, open and close the control/restriction valves after a totalizer value from a flowmeter matches a setpoint and, at the end, discontinue the LAS execution.

The method (1600) includes initializing (1610) the LAS by, for instance, presenting an LAS screen to an operator to prepare a cement slurry recipe. The operator then schedules (1615) a cement slurry recipe and edits/saves the cement slurry recipe. The method (1600) then includes running (1620) the cement slurry recipe via the LAS screen. The operator then selects the recipe for the cement slurry and clicks on the screen to run (1625) a batch process for the recipe. The auto-batch totalizer is then reset (1630). The method (1600) then includes controlling (1635) LAS control valves of selected LAS lines to be auto-opened.

A volume setpoint for the cement slurry recipe is tested (1640) to determine whether it is greater than 2.5 gallons, or some other predetermined volume, such as may range between about 0.5 gallons and about 10 gallons. If the volume setpoint is greater than the predetermined volume, then restriction valves are opened (1645). If the volume setpoint is less than the predetermined volume, then a value of the auto-batch totalizer is compared (1650) with the volume setpoint. The value of the auto-batch totalizer is then tested (1655) against the volume setpoint. If the value of the auto-batch totalizer is greater than the volume setpoint of (for example) 2.5 gallons, the restriction valves are closed (1660). If the value of the auto-batch totalizer is less than the volume setpoint of (for example) 2.5 gallons, the value of the auto-batch totalizer is retested (1665) against a higher volume setpoint. If the value of the auto-batch totalizer is greater than the volume setpoint of (for example) 5 gallons, the LAS control valves are closed (1670), otherwise, the value of the auto-batch totalizer is again compared (1650) with the volume setpoint.

Figure 17:
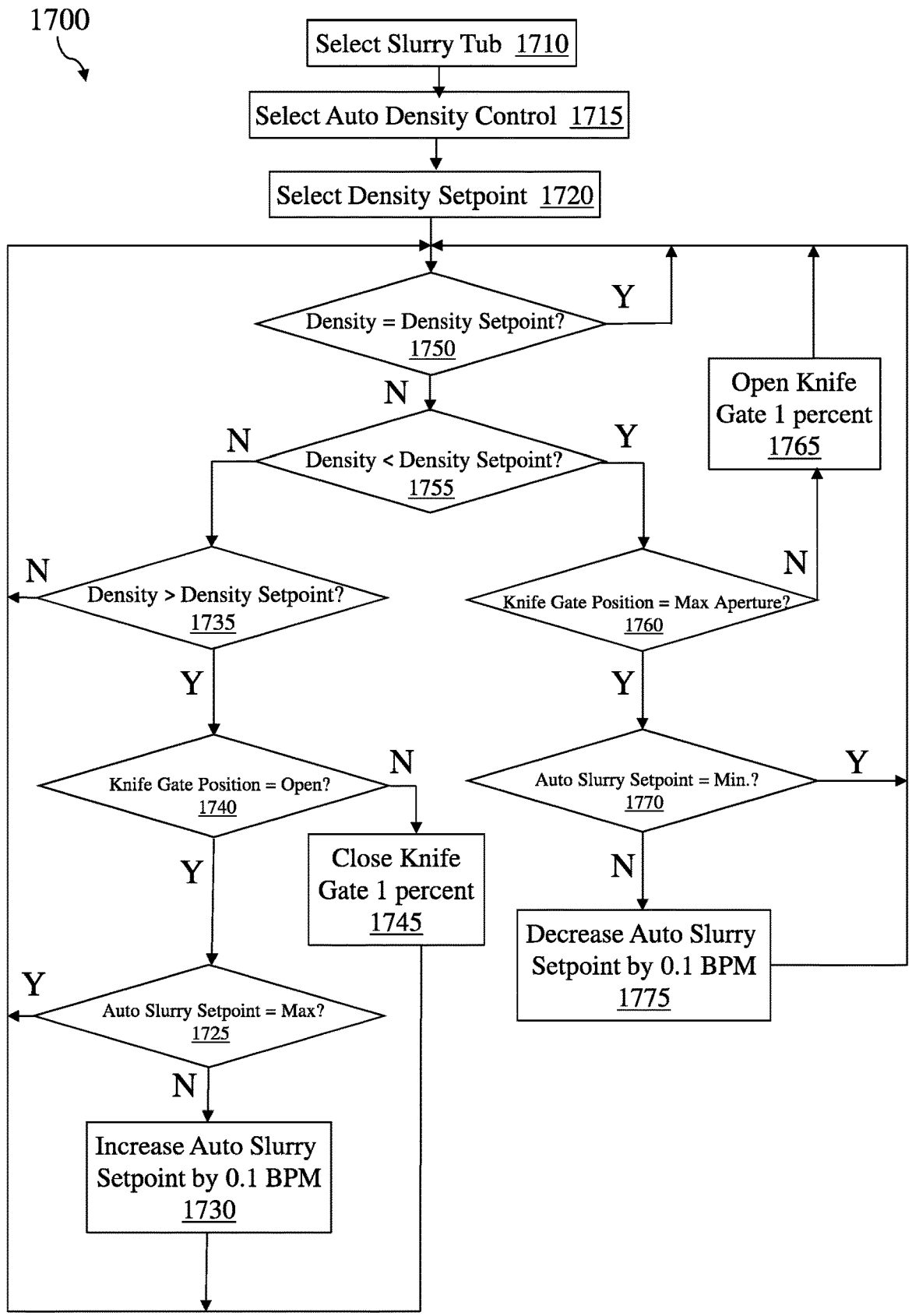

FIG. 17 is a flow-chart diagram of at least a portion of an example implementation of a method (1700) of operating a cementing unit according to one or more aspects of the present disclosure. In the following description, example acceptance criteria for density control include density steady-state error of $\Delta\rho=0.2$ for a 95 percent of cement slurry, setpoint change overshoot $\Delta\rho OS=0.2$ parts per gallon (ppg), and rate change overshoot $\Delta\rho_{RC}=0.2$ ppg. However, other implementations of the method (1700) within the scope of the present disclosure may include different and/or additional parameters and/or values.

The method (1700) may include selecting (1710) a slurry tub icon from an HMI screen, and then selecting (1715) an auto density control icon. A density setpoint (e.g., 14 ppg) for a cement slurry is then selected (1720). The density of the cement slurry is then tested (1750) against the density setpoint. If the density of the cement slurry equals the density setpoint, the density testing (1750) is repeated.

If the density of the cement slurry does not equal the density setpoint, the method (1700) includes testing (1755) to determine whether the density of the cement slurry is less than the density setpoint. If the density of the cement slurry is less than the density setpoint, the method (1700) includes determining (1760) whether a knife gate position is at a maximum aperture. If the density of the cement slurry is not less than the density setpoint, the method (1700) includes testing (1735) to ascertain whether the density of the cement slurry is greater than the density setpoint. If the density of the cement slurry is greater than the density setpoint, the method (1700) includes determining (1740) whether the knife gate position is open, otherwise the density testing (1750) is repeated.

If the knife gate position is not open, the knife gate position is closed (1745), such as by about one percent or some other predetermined value (such as may range between about 0.5% and about 10%), and then the density testing (1750) is repeated. If the knife gate position is open, the method (1700) includes testing (1725) to determine whether the automatic cement slurry setpoint equals a maximum value. If the automatic cement slurry setpoint equals the maximum value, the density testing (1750) is repeated. If the automatic cement slurry setpoint does not equal the maximum value, the automatic cement slurry setpoint is increased (1730), such as by about 0.1 barrels per minute (bpm) or some other predetermined value (such as may range between about 0.01 bpm and about 5.0 bpm), and then the density testing (1750) is repeated.

Returning to the knife gate position testing (1760), if the knife gate position is not at the maximum aperture, the knife gate position is opened (1765), such as by about one percent or some other predetermined value (such as may range between about 0.5% and about 10%), and then the density testing (1750) is repeated. If the knife gate position is at the maximum aperture, the method (1700) includes testing (1770) to determine whether the automatic cement slurry setpoint equals a minimum value. If the automatic slurry setpoint equals the minimum value, the density testing (1750) is repeated. If the automatic slurry setpoint does not equal the minimum value, the automatic slurry setpoint is decreased (1775), such as by about 0.1 bpm or some other predetermined value (such as may range between about 0.01 bpm and about 5.0 bpm), and then the density testing (1750) is repeated.

Figure 18:
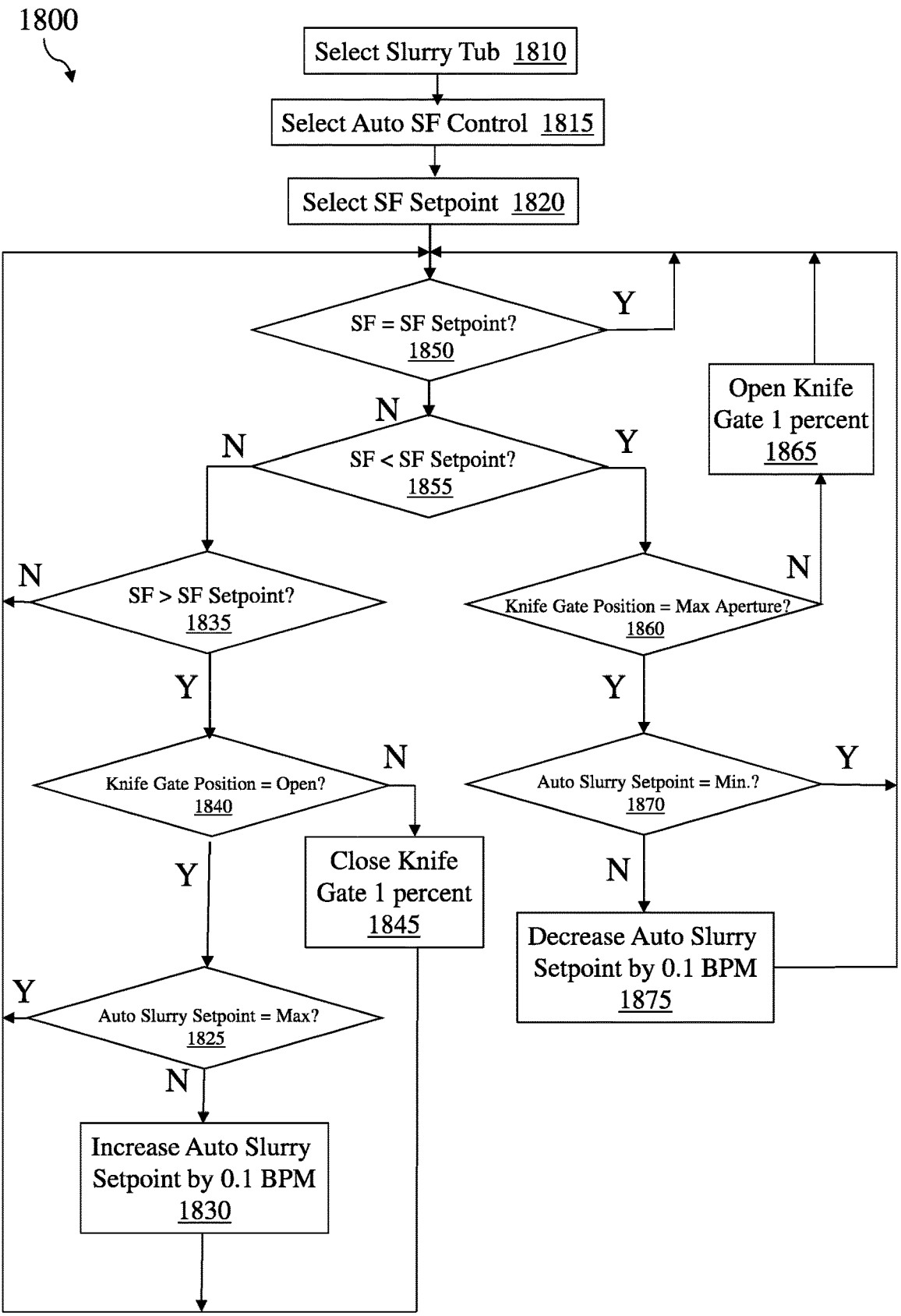

FIG. 18 is a flow-chart diagram of at least a portion of an example implementation of a method (1800) of operating a cementing unit according to one or more aspects of the present disclosure. The method (1800) may include selecting (1810) a slurry tub icon from an HMI screen, and then selecting (1815) an auto solids fraction (SF) control icon. The method (1800) includes selecting (1820) a SF setpoint for a cement slurry. The SF of the cement slurry is tested (1850) against the SF setpoint. If the SF of the cement slurry equals the SF setpoint, the SF testing (1850) is repeated.

If the SF of the cement slurry does not equal the SF setpoint, the method (1800) includes testing (1855) to determine whether the SF of the cement slurry is less than the SF setpoint. If the SF of the cement slurry is less than the SF setpoint, the method (1800) includes determining (1860) whether a knife gate position is at a maximum aperture. If the SF of the cement slurry is not less than the SF setpoint, the method (1800) includes testing (1835) to determine whether the SF of the cement slurry is greater than the SF setpoint. If the SF of the cement slurry is greater than the SF setpoint, the method (1800) includes determining (1840) whether the knife gate position is open, otherwise the SF testing (1850) is repeated.

If the knife gate position is not open, the knife gate position is closed (1845), such as by about one percent or some other predetermined value (such as may range between about 0.5% and about 10%), and then the SF testing (1850) is repeated. If the knife gate position is open, the method (1800) includes testing (1825) to determine whether the automatic cement slurry setpoint equals a maximum value. If the automatic cement slurry setpoint equals the maximum value, the SF testing (1850) is repeated. If the automatic slurry setpoint does not equal the maximum value, the automatic cement slurry setpoint is increased (1830), such as by about 0.1 bpm or some other predetermined value (such as may range between about 0.01 bpm and about 5.0 bpm), and then the SF testing (1850) is repeated.

If the knife gate position is determined (1860) to not be at the maximum aperture, the knife gate position is opened (1865), such as by about one percent or some other predetermined value (such as may range between about 0.5% and about 10%), and then the SF testing (1850) is repeated. If the knife gate position is determined (1860) to be at the maximum aperture, the method (1800) includes testing (1870) to determine whether the automatic cement slurry setpoint equals a minimum value. If the automatic cement slurry setpoint equals the minimum value, the SF testing (1850) is repeated. If the automatic slurry setpoint does not equal the minimum value, the automatic cement slurry setpoint is decreased (1875), such as by about 0.1 bpm or some other predetermined value (such as may range between about 0.01 bpm and about 5.0 bpm), and then the SF testing (1850) is repeated.

Figure 19:
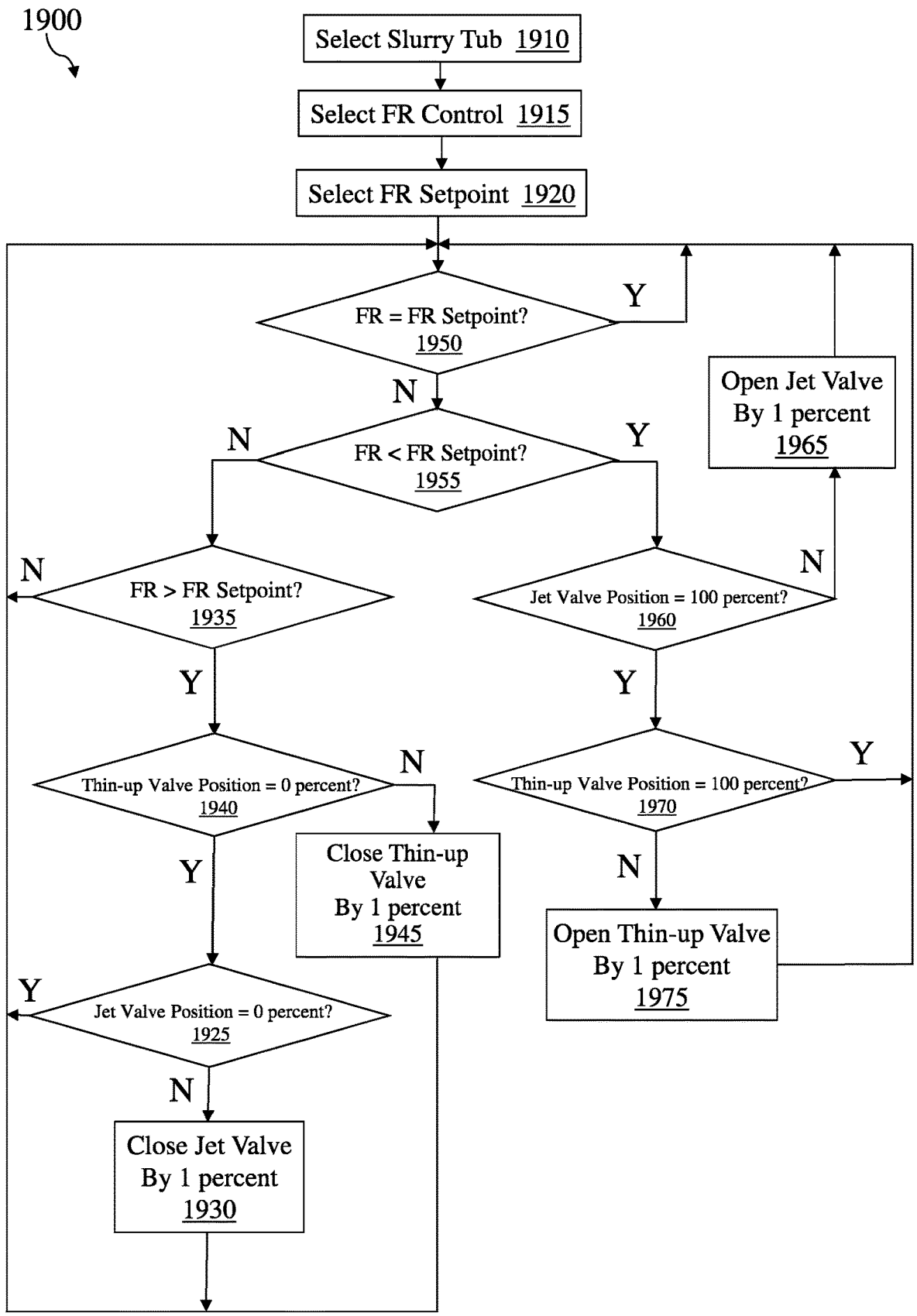

FIG. 19 is a flow-chart diagram of at least a portion of an example implementation of a method (1900) of operating a cementing unit according to one or more aspects of the present disclosure. The method (1900) may include selecting (1910) a slurry tub icon from an HMI screen, and then selecting (1915) a mix fluid flow rate (FR) control icon. The method (1900) includes selecting (1920) a FR setpoint for a cement slurry. The FR of the cement slurry is then tested (1950) against the FR setpoint. If the FR of the cement slurry equals the FR setpoint, the FR testing (1950) is repeated.

If the FR of the cement slurry does not equal the FR setpoint, the method (1900) includes testing (1955) to determine whether the FR of the cement slurry is less than the FR setpoint. If the FR of the cement slurry is less than the FR setpoint, the method (1900) includes determining (1960) whether a jet valve position is 100 percent. If the FR of the cement slurry is not less than the FR setpoint, the method (1900) includes testing (1935) to determine whether the FR of the cement slurry is greater than the FR setpoint. If the FR of the cement slurry is greater than the FR setpoint, the method (1900) includes determining (1940) whether a thin-up valve position is zero percent, otherwise the FR testing (1950) is repeated.

If the thin-up valve position is determined (1940) to not be zero percent, the thin-up valve is closed (1945), such as by about one percent or some other predetermined value (such as may range between about 0.5% and about 10%), and then the FR testing (1950) is repeated. If the thin-up valve position is determined (1940) to be zero percent, the method (1900) includes testing (1925) to determine whether the jet valve position is zero percent. If the jet valve position is zero percent, the FR testing (1950) is repeated. If the jet valve position is not zero percent, the jet valve is closed (1930), such as by about one percent or some other predetermined value (such as may range between about 0.5% and about 10%), and then the FR testing (1950) is repeated.

If the jet valve position is determined (1960) to not be 100 percent, the jet valve position is opened (1965), such as by about one percent or some other predetermined value (such as may range between about 0.5% and about 10%), and then the FR testing (1950) is repeated. If the jet valve position is 100 percent, the method (1900) includes determining (1970) whether the thin-up valve position is 100 percent. If the thin-up valve position is 100 percent, the FR testing (1950) is repeated. If the thin-up valve position is not 100 percent, the thin-up valve position is opened (1975), such as by about one percent or some other predetermined value (such as may range between about 0.5% and about 10%), and then the FR testing (1950) is repeated.

Figure 20:
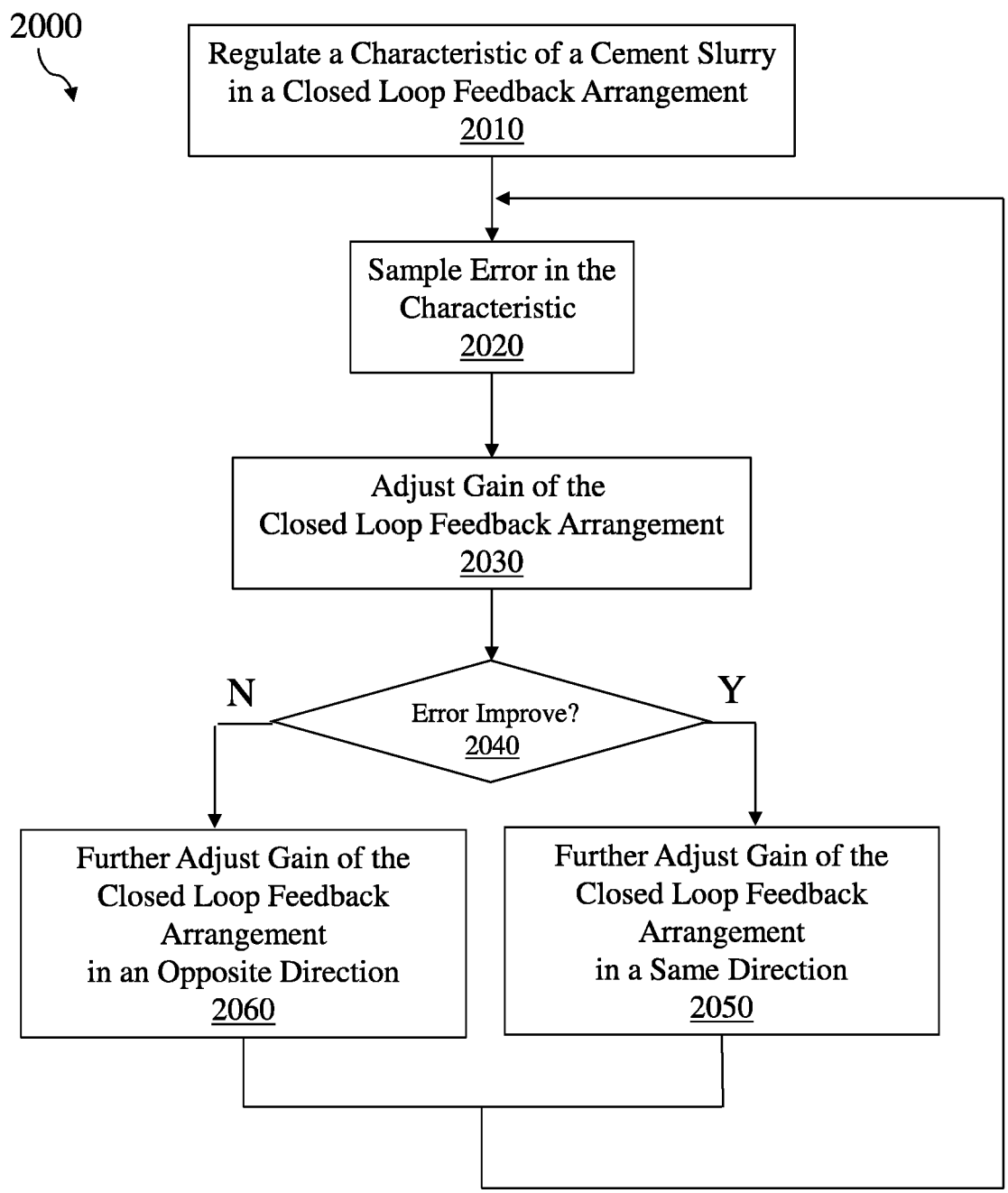

FIG. 20 is a flow-chart diagram of at least a portion of an example implementation of a method (2000) of operating a cementing unit according to one or more aspects of the present disclosure. The method (2000) is operable to control a characteristic of a cement slurry at the cementing unit in, for instance, real time. The method (2000) includes regulating (2010) a characteristic of the cement slurry employing a closed loop feedback arrangement in the cementing unit. The method (2000) also includes sampling (2020) an error of the characteristic. The method (2000) also includes adjusting (2030) a gain (e.g., a proportional gain, an integral gain and a derivative gain) of the closed loop feedback arrangement in response to sampling (2020) the error of the characteristic. The gain of the closed loop feedback arrangement may comprise at least one of a solids fraction gain and a density gain of the cement slurry.

The method (2000) also includes determining (2040) whether the error improved. If the error improved, the gain of the closed loop feedback arrangement is further adjusted (2050) in a same direction as the previous adjustment (2030). If the error did not improve, the gain of the closed loop feedback arrangement is adjusted (2060) in an opposite direction as the previous adjustment (2030). The error in the characteristic is then resampled (2020).

The adjustment (2030, 2050, and/or 2060) to the gain of the closed loop feedback arrangement may be proportionally to the error of the characteristic. The adjustment (2030, 2050, and/or 2060) to the gain of the closed loop feedback arrangement may also or instead employ a statistical algorithm that incorporates historical data of an operation of the cementing unit. The historical data may comprise cementing parameters that describe a state of the cementing unit and/or features of the cementing unit such as, without limitation, a mix fluid flow rate, a mix additive, a mix age and a mix temperature. The historical data may also be employed to predict future feedback gains based on a trend in the historical data in accordance with adjusting the gain of the closed loop feedback arrangement.

Figure 21:
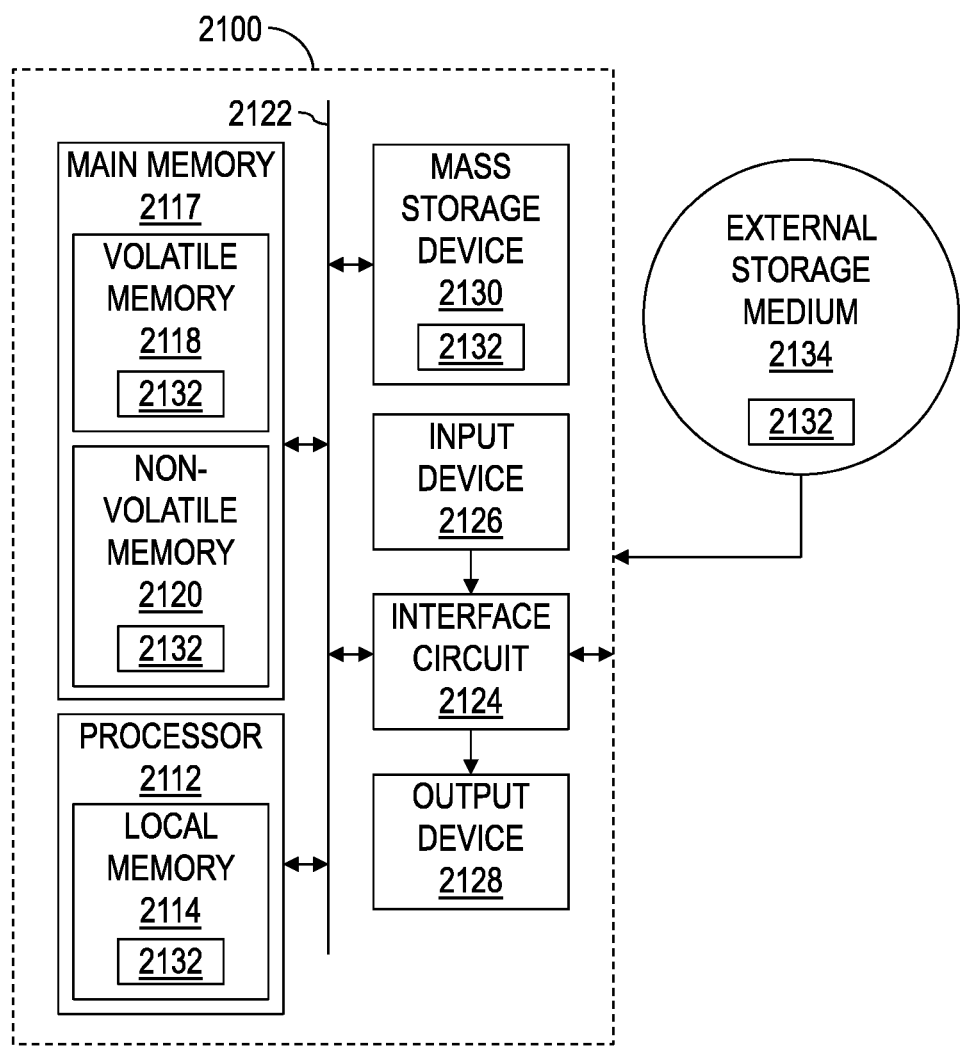
FIG. 21 is a schematic view of at least a portion of an example implementation of apparatus according to one or more aspects of the present disclosure.

FIG. 21 is a schematic view of at least a portion of an example implementation of apparatus according to one or more aspects of the present disclosure. More specifically, FIG. 21 is a schematic view of at least a portion of an example implementation of a system that may be formed with or as the controller 275 to control a characteristic of a cement slurry of a cementing unit 200 of FIG. 2 according to one or more aspects of the present disclosure. The system includes a processing system 2100 may execute example machine-readable instructions to implement at least a portion of one or more of the methods and/or processes described herein, including to implement at least a portion of the controller 275 at a wellsite. The processing system 2100 may be or comprise, for example, one or more processors, controllers, special-purpose computing devices, servers, personal computers, personal digital assistant (PDA) devices, smartphones, smart glasses, tablets, internet appliances, and/or other types of computing devices. Moreover, while it is possible that the entirety of the processing system 2100 shown in FIG. 21 is implemented within the controller 275, it is also contemplated that one or more components or functions of the processing system 2100 may be external to the controller 275.

The processing system 2100 comprises a processor 2112 such as, for example, a general-purpose programmable processor. The processor 2112 may comprise a local memory 2114, and may execute coded instructions 2132 present in the local memory 2114 and/or another memory device. The processor 2112 may execute, among other things, machine-readable instructions or programs to implement the methods and/or processes described herein. The programs stored in the local memory 2114 may include program instructions or computer program code that, when executed by an associated processor, permit surface equipment at a wellsite or offsite to perform tasks as described herein. The processor 2112 may be, comprise, or be implemented by one or a plurality of processors of various types suitable to the local application environment, and may include one or more of general- or special-purpose computers, microprocessors, digital signal processors (DSPs), field-programmable gate arrays (FPGAs), application-specific integrated circuits (ASICs), and processors based on a multi-core processor architecture, as non-limiting examples. Other processors from other families are also appropriate.

The processor 2112 may be in communication with a main memory 2117, such as may include a volatile memory 2118 and a non-volatile memory 2120, perhaps via a bus 2122 and/or other communication means. The volatile memory 2118 may be, comprise, or be implemented by random access memory (RAM), static random access memory (SRAM), synchronous dynamic random access memory (SDRAM), dynamic random access memory (DRAM), RAMBUS dynamic random access memory (RDRAM) and/or other types of random access memory devices. The non-volatile memory 2120 may be, comprise, or be implemented by read-only memory, flash memory and/or other types of memory devices. One or more memory controllers (not shown) may control access to the volatile memory 2118 and/or the non-volatile memory 2120.

The processing system 2100 may also comprise an interface circuit 2124. The interface circuit 2124 may be, comprise, or be implemented by various types of standard interfaces, such as an Ethernet interface, a universal serial bus (USB), a third generation input/output (3GIO) interface, a wireless interface, and/or a cellular interface, among others. The interface circuit 2124 may also comprise a graphics driver card. The interface circuit 2124 may also comprise a device such as a modem or network interface card to facilitate exchange of data with external computing devices via a network (e.g., Ethernet connection, digital subscriber line (DSL), telephone line, coaxial cable, cellular telephone system, satellite, etc.). The interface circuit 2124 may also implement, be implemented by, or otherwise permit the control of a characteristic of the cementing unit 200 depicted in FIG. 2.

One or more input devices 2126 may be connected to the interface circuit 2124. The input device(s) 2126 may permit a user to enter data and commands into the processor 2112, such as the HMI 420 shown in FIG. 4. The input device(s) 2126 may be, comprise, or be implemented by, for example, a keyboard, a mouse, a touchscreen, a track-pad, a trackball, an isopoint, and/or a voice recognition system, among others. The input device(s) 2126 may comprise an image-capturing device configured to capture an image or video and provide visual content of field equipment at a wellsite.

One or more output devices 2128 may also be connected to the interface circuit 2124. The output devices 2128 may be, comprise, or be implemented by, for example, display devices (e.g., a liquid crystal display or cathode ray tube display (CRT), among others), printers, and/or speakers, among others.

The processing system 2100 may also comprise one or more mass storage devices 2130 for storing machine-readable instructions and data. Examples of such mass storage devices 2130 include floppy disk drives, hard drive disks, compact disk (CD) drives, and digital versatile disk (DVD) drives, among others. The coded instructions 2132 may be stored in the mass storage device 2130, the volatile memory 2118, the non-volatile memory 2120, the local memory 2114, and/or on a removable and/or external storage medium 2134, such as a CD or DVD. Thus, the modules and/or other components of the processing system 2100 may be implemented in accordance with hardware (embodied in one or more chips including an integrated circuit such as an ASIC), or may be implemented as software or firmware for execution by a processor. In particular, in the case of firmware or software, the embodiment can be provided as a computer program product including a computer readable medium or storage structure embodying computer program code (i.e., software or firmware) thereon for execution by the processor.

The methods and processes as described herein may be performed with a controller for a cementing unit at a wellsite, and are scalable to a plurality of cementing units at a plurality of wellsites. Also, the controller may provide visual information to an operator representing an operational state of the wellsite equipment. The methods may be implemented with algorithms performed through a firmware framework run in the controller. The firmware framework architecture provides primary services and abstract classes. The firmware code can build project-specific instances on framework primary services, children of generic parent classes. The firmware application can be composed dynamically to support a wide variety of hardware implementations.

In view of the entirety of the present disclosure, including the claims and the figures, a person having ordinary skill in the art will readily recognize that the present disclosure introduces an apparatus operable to control a characteristic of a cement slurry at a cementing unit, comprising: a processor; and a memory including computer program code, wherein the processor, the memory, and the computer program code are collectively operable to: regulate a characteristic of the cement slurry employing a closed loop feedback arrangement in the cementing unit; and adjust a gain of the closed loop feedback arrangement in response to sampling an error of the characteristic.

The gain may be selected from the group consisting of: a proportional gain; an integral gain; and a derivative gain.

The processor, the memory, and the computer program code may be collectively operable to further adjust the gain of the closed loop feedback arrangement in a same direction if the error of the characteristic improves.

The processor, the memory, and the computer program code may be collectively operable to further adjust the gain of the closed loop feedback arrangement in an opposite direction if the error of the characteristic degrades.

The processor, the memory, and the computer program code may be collectively operable to adjust the gain of the closed loop feedback arrangement proportionally to the error of the characteristic.

The gain of the closed loop feedback arrangement may comprise at least one of a solids fraction gain and a density gain of the cement slurry.

The processor, the memory, and the computer program code may be collectively operable to adjust the gain of the closed loop feedback arrangement by employing a statistical algorithm that incorporates historical data of an operation of the cementing unit. The historical data may comprise cementing parameters that describe a state of the cementing unit. The historical data may comprise features of the cementing unit. The features may comprise at least one of a mix fluid flow rate, a mix additive, a mix age, and a mix temperature. The historical data may be employed to predict future feedback gains based on a trend in the historical data.

The present disclosure also introduces a method for controlling a characteristic of a cement slurry at a cementing unit, comprising: regulating a characteristic of the cement slurry employing a closed loop feedback arrangement in the cementing unit; and adjusting a gain of the closed loop feedback arrangement in response to sampling an error of the characteristic.

The gain may be selected from the group consisting of: a proportional gain; an integral gain; and a derivative gain.

The adjusting may further comprise adjusting the gain of the closed loop feedback arrangement in a same direction if the error of the characteristic improves.

The adjusting may further comprise adjusting the gain of the closed loop feedback arrangement in an opposite direction if the error of the characteristic degrades.

The adjusting may further comprise adjusting the gain of the closed loop feedback arrangement proportionally to the error of the characteristic.

The gain of the closed loop feedback arrangement may comprise at least one of a solids fraction gain and a density gain of the cement slurry.

The adjusting may further comprise adjusting the gain of the closed loop feedback arrangement by employing a statistical algorithm that incorporates historical data of an operation of the cementing unit. The historical data may comprise cementing parameters that describe a state of the cementing unit. The historical data may comprise features of the cementing unit. The features may comprise at least one of a mix fluid flow rate, a mix additive, a mix age, and a mix temperature. The historical data may be employed to predict future feedback gains based on a trend in the historical data.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same functions and/or achieving the same benefits of the embodiments introduced herein. A person having ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. § 1.72(b) to permit the reader to quickly ascertain the nature of the technical disclosure. It is submitted with the understanding that it will not be used to interpret or limit the scope or meaning of the claims.

What is claimed is:

1. An apparatus operable to control a density or solids fraction of a cement slurry at a cementing unit, comprising:
    a processor; and
    a non-transitory computer readable memory including computer program code, wherein the processor, the memory, and the computer program code are collectively operable to:
        regulate the density or the solids fraction of the cement slurry employing a proportional-integral-derivative (PID) control loop feedback arrangement in the cementing unit;
        identify proportional, integral, and derivative gains of the PID control loop to be used for reducing a density error or a solids fraction error, based on information in a database, wherein the information includes historical gain values with resulting cementing errors associated with the historical gain values, wherein identifying the proportional, integral, and derivative gains includes identifying a subset of the proportional, integral, and derivative gains that is impacted by a feature of the cementing unit; and
        adjust the proportional, integral, and derivative gains of the PID control loop feedback arrangement in response to the density error or the solids fraction error based on the identification, wherein adjusting the proportional, integral, and derivative gains alters a volumetric flow rate of at least one of a cement blend or a mix fluid to adjust the density or the solids fraction of the cement slurry.

2. The apparatus of claim 1, wherein the processor, the memory, and the computer program code are collectively operable to further adjust one or more of the proportional, integral, and derivative gains of the PID control loop feedback arrangement in a same direction if the density error or the solids fraction error improves.

3. The apparatus of claim 1, wherein the processor, the memory, and the computer program code are collectively operable to further adjust one or more of the proportional, integral, and derivative gains of the PID control loop feedback arrangement in an opposite direction if the density error or the solids fraction error degrades.

4. The apparatus of claim 1, wherein the processor, the memory, and the computer program code are collectively operable to further adjust one or more of the proportional, integral, and derivative gains of the PID control loop feedback arrangement proportionally to the density error or the solids fraction error.

5. The apparatus of claim 1, wherein the processor, the memory, and the computer program code are collectively operable to further adjust one or more of the proportional, integral, and derivative gains of the PID control loop feedback arrangement by employing a statistical algorithm that incorporates historical data of an operation of the cementing unit.

6. The apparatus of claim 5 wherein the historical data comprise cementing parameters that describe a state of the cementing unit.

7. The apparatus of claim 5 wherein the historical data is associated with at least one of a mix fluid flow rate for the cementing unit, a mix additive for the cementing unit, a mix age for the cementing unit, and a mix temperature for the cementing unit.

8. The apparatus of claim 1, wherein adjusting the proportional, integral, and derivative gains of the PID control loop feedback arrangement is operative to alter a position of a knife gate that alters the volumetric flow rate of the cement blend or a position of a valve that alters the volumetric flow rate of the mix fluid.

9. The apparatus of claim 8, wherein adjusting the proportional, integral, and derivative gains of the PID control loop feedback arrangement is further operative to (i) output a setpoint for the knife gate that is input into a knife gate PID controller that in turn outputs a control signal that causes the knife gate to alter the volumetric flow rate of the cement blend, or (ii) output a setpoint for the valve that is input into a valve PID controller that in turn outputs a control signal that causes the valve to alter the volumetric flow rate of the mix fluid.

10. A method for controlling a density or a solids fraction of a cement slurry at a cementing unit, the method comprising:
    regulating the density or the solids fraction the cement slurry employing a proportional-integral-derivative (PID) control loop feedback arrangement in the cementing unit;
    identify proportional, integral, and derivative gains of the PID control loop to be used for reducing a density error or a solids fraction error, based on information in a database, wherein the information includes historical gain values with resulting cementing errors associated with the historical gain values, wherein identifying the proportional, integral, and derivative gains includes identifying a subset of the proportional, integral, and derivative gains that is impacted by a feature of the cementing unit; and
    adjusting the proportional, integral, and derivative gains of the PID control loop feedback arrangement in response to the density error or the solids fraction error based on the identification, wherein adjusting the proportional, integral, and derivative gains alters a volumetric flow rate of at least one of a cement blend or a mix fluid to adjust the density or the solids fraction of the cement slurry.

11. The method of claim 10 wherein the adjusting further comprises adjusting one or more of the proportional, integral, and derivative gains of the PID control loop feedback arrangement in a same direction if the density error or the solids fraction error improves.

12. The method of claim 10 wherein the adjusting further comprises adjusting one or more of the proportional, integral, and derivative gains of the PID control loop feedback arrangement in an opposite direction if the density error or the solids fraction error degrades.

13. The method of claim 10 wherein the adjusting further comprises adjusting one or more of the proportional, integral, and derivative gains of the PID control loop feedback arrangement proportionally to the density error or the solids fraction error.

14. The method of claim 10 wherein the adjusting further comprises adjusting one or more of the proportional, integral, and derivative gains of the PID control loop feedback arrangement by employing a statistical algorithm that incorporates historical data of an operation of the cementing unit.

15. The method of claim 14 wherein the historical data comprise cementing parameters that describe a state of the cementing unit.

16. The method of claim 14 wherein the historical data is associated with the cementing unit.

17. The method of claim 16 wherein the historical data is associated with at least one of a mix fluid flow rate for the cementing unit, a mix additive for the cementing unit, a mix age for the cementing unit, and a mix temperature for the cementing unit.

18. The method of claim 14 wherein the historical data is employed to predict future feedback gains based on a trend in the historical data.

19. The method of claim 10, wherein adjusting the proportional, integral, and derivative gains of the PID control loop feedback arrangement is operative to alter a position of a knife gate that alters the volumetric flow rate of the cement blend or a position of a valve that alters the volumetric flow rate of the mix fluid.

20. The method of claim 19, wherein adjusting the proportional, integral, and derivative gains of the PID control loop feedback arrangement is further operative to (i) output a setpoint for the knife gate that is input into a knife gate PID controller that in turn outputs a control signal that causes the knife gate to alter the volumetric flow rate of the cement blend, or (ii) output a setpoint for the valve that is input into a valve PID controller that in turn outputs a control signal that causes the valve to alter the volumetric flow rate of the mix fluid.

* * * * *